(12) United States Patent
Yang et al.

(10) Patent No.: US 12,701,608 B2
(45) Date of Patent: Aug. 4, 2026

(54) CHANNEL ACCESS METHOD AND APPARATUS

(71) Applicant: HUAWEI TECHNOLOGIES CO., LTD., Shenzhen (CN)

(72) Inventors: Bo Yang, Moscow (RU); Zheng Chen, Nanjing (CN); Peng Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 18/408,997

(22) Filed: Jan. 10, 2024

(65) Prior Publication Data

US 2024/0215066 A1      Jun. 27, 2024

Related U.S. Application Data

(63) Continuation of application No. PCT/CN2022/104639, filed on Jul. 8, 2022.

(30) Foreign Application Priority Data

Jul. 13, 2021    (CN) .......................... 202110791172.5

(51) Int. Cl.
| | |
|---|---|
| *H04W 74/04* | (2009.01) |
| *H04W 74/08* | (2009.01) |
| *H04W 84/12* | (2009.01) |

(52) U.S. Cl.
CPC ....... *H04W 74/04* (2013.01); *H04W 74/0875* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,077,614 B2 * | 12/2011 | Ji | .............................. | H04J 3/06 |
| | | | | 370/252 |
| 8,125,952 B2 * | 2/2012 | Sampath | ............... | H04W 74/02 |
| | | | | 370/330 |

(Continued)

FOREIGN PATENT DOCUMENTS

| | | |
|---|---|---|
| CN | 103222311 A | 7/2013 |
| CN | 104168662 A | 11/2014 |

(Continued)

OTHER PUBLICATIONS

LAN/MAN Standards Committee of the IEEE Computer Society:"IEEE P802.11ax™ /D8.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN." IEEE P802.11ax™ /D8.0, Oct. 2020. total 820 pages.

(Continued)

*Primary Examiner* — Faiyazkhan Ghafoerkhan
(74) *Attorney, Agent, or Firm* — WOMBLE BOND DICKINSON (US) LLP

(57) ABSTRACT

Embodiments of this application disclose a channel access method and apparatus. The method includes: A first device determines a first frame, where the first frame includes first indication information, the first indication information indicates a first AP in at least one access point AP to perform contention access for a first traffic in a first slot, and the first traffic includes a traffic for which channel access is performed by using a priority interframe space PIFS; and the first device sends the first frame to the first AP. According to embodiments of this application, contention and a collision (Continued)

| Slot 1 | Slot 2 | Slot 3 | Slot 4 | Slot 5 | Slot 1 | Slot 2 | Slot 3 | Slot 4 | Slot 5 |
|---|---|---|---|---|---|---|---|---|---|

Slot 1  AP 1              Slot 3  AP 3              Slot 5  AP 5

Slot 2  AP 2              Slot 4  AP 4 with another AP in a channel access process are avoided, to improve quality of service of a traffic.

20 Claims, 23 Drawing Sheets

(56)                    References Cited

U.S. PATENT DOCUMENTS

| | | | | |
|---|---|---|---|---|
| 8,503,486 | B2 * | 8/2013 | Ji | H04J 3/06 370/252 |
| 8,923,343 | B2 * | 12/2014 | Ji | H04J 3/0664 370/252 |
| 9,504,032 | B2 * | 11/2016 | Wang | H04W 52/0235 |
| 10,034,245 | B2 * | 7/2018 | Wang | H04W 74/08 |
| 10,070,460 | B2 | 9/2018 | Sivakumar et al. | |
| 10,966,152 | B2 * | 3/2021 | Wang | H04W 74/08 |
| 2002/0154653 | A1 * | 10/2002 | Benveniste | H04W 74/085 370/445 |
| 2002/0163933 | A1 * | 11/2002 | Benveniste | H04W 28/02 370/465 |
| 2004/0264428 | A1 | 12/2004 | Choi et al. | |
| 2006/0039281 | A1 * | 2/2006 | Benveniste | H04L 12/413 370/230 |
| 2007/0019664 | A1 * | 1/2007 | Benveniste | H04L 47/2433 370/445 |
| 2007/0019665 | A1 * | 1/2007 | Benveniste | H04W 28/0252 370/445 |
| 2007/0041398 | A1 * | 2/2007 | Benveniste | H04L 47/283 370/448 |
| 2007/0047570 | A1 * | 3/2007 | Benveniste | H04L 47/32 370/448 |
| 2008/0013567 | A1 * | 1/2008 | Benveniste | H04L 47/2416 370/447 |
| 2009/0147768 | A1 * | 6/2009 | Ji | H04J 3/06 370/350 |
| 2010/0284312 | A1 * | 11/2010 | Sampath | H04W 74/02 375/267 |
| 2012/0044924 | A1 * | 2/2012 | Ji | H04J 3/06 370/338 |
| 2013/0294438 | A1 * | 11/2013 | Ji | H04J 3/06 370/350 |
| 2014/0010081 | A1 * | 1/2014 | Benveniste | H04L 47/245 370/230 |
| 2014/0059218 | A1 * | 2/2014 | Ganu | H04W 48/02 709/224 |
| 2014/0071873 | A1 * | 3/2014 | Wang | H04W 72/21 370/336 |
| 2016/0165624 | A1 * | 6/2016 | Benveniste | H04L 47/2433 370/230 |
| 2016/0242040 | A1 * | 8/2016 | Ganu | H04W 48/02 |
| 2016/0286477 | A1 * | 9/2016 | Lin | H04W 48/20 |
| 2017/0048799 | A1 * | 2/2017 | Wang | H04W 52/0235 |
| 2018/0295580 | A1 * | 10/2018 | Wang | H04W 72/21 |
| 2019/0246348 | A1 * | 8/2019 | Lin | H04W 48/20 |
| 2021/0112492 | A1 * | 4/2021 | Lin | H04W 48/20 |
| 2021/0168712 | A1 * | 6/2021 | Cherian | H04W 52/0216 |
| 2023/0209466 | A1 * | 6/2023 | Cherian | H04W 72/0453 370/329 |
| 2024/0215066 | A1 * | 6/2024 | Yang | H04W 74/0816 |
| 2024/0276525 | A1 * | 8/2024 | Chun | H04W 72/27 |
| 2024/0283587 | A1 * | 8/2024 | Chun | H04W 8/22 |
| 2025/0024369 | A1 * | 1/2025 | Cherian | H04W 76/11 |

FOREIGN PATENT DOCUMENTS

| | | |
|---|---|---|
| CN | 111542123 A | 8/2020 |
| CN | 111836392 A | 10/2020 |
| CN | 112087769 A | 12/2020 |

OTHER PUBLICATIONS

LAN/MAN Standards Committee of the IEEE Computer Society:"IEEE P802.11be™ /D1.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT)." IEEE P802.11be™ /D1.0, May 2021. total 635 pages.

IEEE Computer Society:"IEEE Standard for Local and metropolitan area networks—Frame Replication and Elimination for Reliability." IEEE 3 Park Avenue New York, NY 10016-5997 USA. IEEE Std 802.1CB™—2017. Sep. 28, 2017. total 102 pages.

IEEE Std 802. Nov. 2007, IEEE Standard for Information technology Telecommunications and information exchange between systems Local and metropolitan area networks Specific requirements Part 11: Wireless LAN Medium Access Control (MAC)and Physical Layer (PHY) Specifications, IEEE Computer Society Sponsored by theLAN/MAN Standards Committee, Jun. 12, 2007, total 1232 pages.

* cited by examiner

| No retransmission | 31 | [0, 279] μs |
| One retransmission | 63 | [0, 567] μs |
| Two retransmissions | 127 | [0, 1143] μs |
| ... | | |
| Five retransmissions | 1024 | [0, 9207] μs |
| More than five retransmissions | 1024 | [0, 9207] μs |

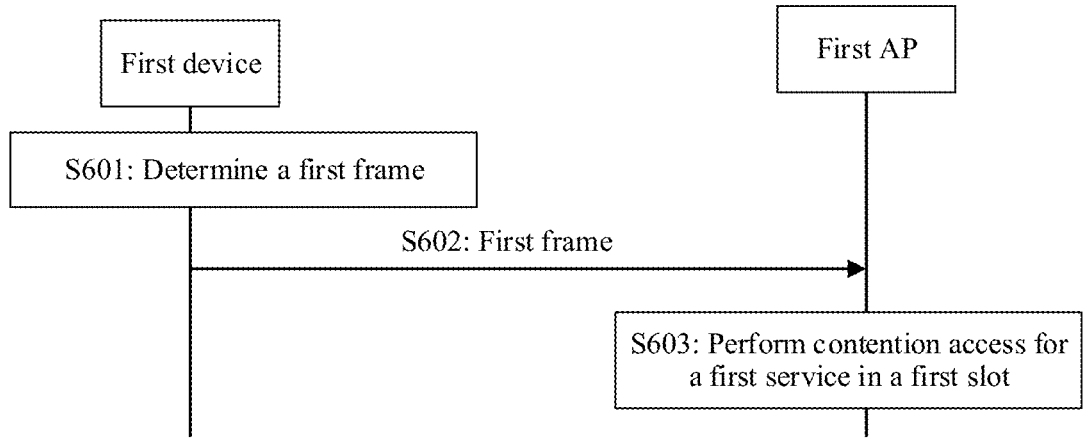
FIG. 6
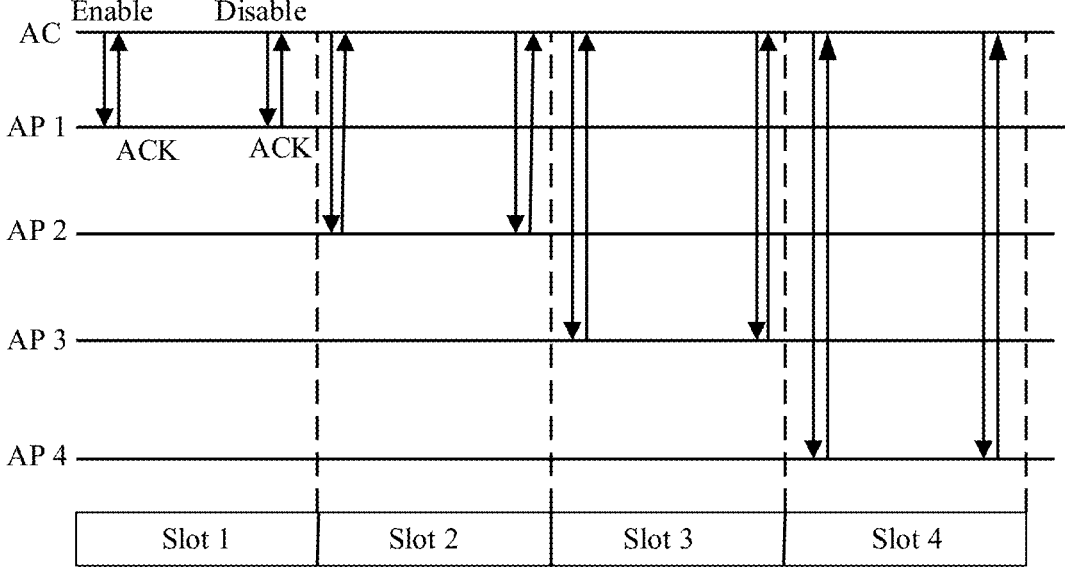
FIG. 7
FIG. 8

| | 0+Δt to 1.6–Δt | 1.6+Δt to 3.2–Δt | 3.2+Δt to 4.8–Δt | 4.8+Δt to 6.4–Δt | 6.4+Δt to 8–Δt | 8+Δt to 10–Δt |
|---|---|---|---|---|---|---|
| AP 1 | | | | | | |
| AP 2 | | | | | | |
| AP 3 | | | | | | |
| AP 4 | | | | | | |
| AP 5 | | | | | | |

| | $0+\Delta t$ to $1.2-\Delta t$ | | $1.2+\Delta t$ to $2.4-\Delta t$ | | $2.4+\Delta t$ to $3.6-\Delta t$ | | $3.6+\Delta t$ to $4.8-\Delta t$ | | $4.8+\Delta t$ to $6-\Delta t$ | | $6+\Delta t$ to $10-\Delta t$ | |
|---|---|---|---|---|---|---|---|---|---|---|---|---|
| AP 1 | | | | | | | | | | | | |
| AP 2 | | | | | | | | | | | | |
| AP 3 | | | | | | | | | | | | |
| AP 4 | | | | | | | | | | | | |
| AP 5 | | | | | | | | | | | | |

FIG. 14

```
┌─────────┐                                              ┌─────────┐
│   AC    │                                              │   AP    │
└─────────┘                                              └─────────┘
     │                                                        │
┌────┴────────────────────────────────────────────┐          │
│ S1801: Determine a start moment of a first slot   │          │
│ by using a local clock of the AC as a second      │          │
│            reference moment                        │          │
└───────────────────────────────────────────────────┘          │
     │                                                        │
     │            S1802: First frame                          │
     │───────────────────────────────────────────────────────▶│
     │                                                        │
```

FIG. 18

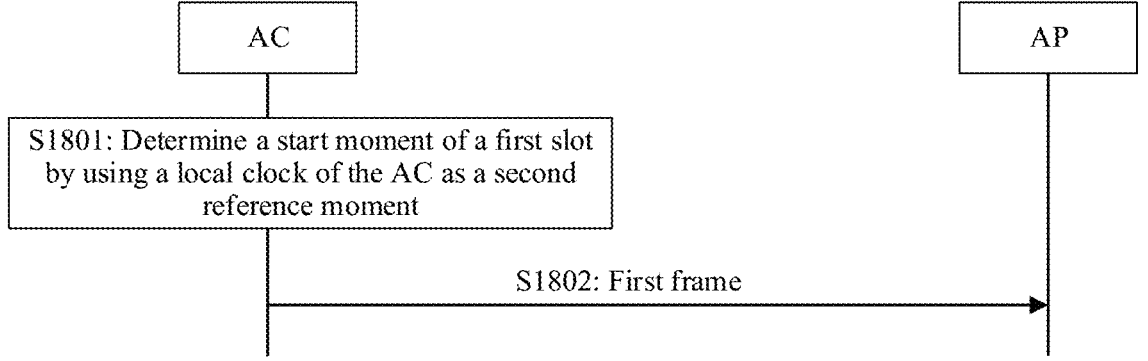

| | 0 to 1.6 | 1.6 to 3.2 | 3.2 to 4.8 | 4.8 to 6.4 | 6.4 to 8 | 8 to 10 |
|---|---|---|---|---|---|---|
| AP 1 | | | | | | |
| AP 2 | | | | | | |
| AP 3 | | | | | | |
| AP 4 | | | | | | |
| AP 5 | | | | | | |

FIG. 19

| 8 μs | 8 μs | 4 ms | 4 μs | 8 μs | 8 μs | | 0 μs |
|------|------|------|------|------|------|--|------|
| L-STF | L-STF | L-SIG | RL-SIG | HE-SIG-A | HE-STF | HE-LTF | PE |

FIG. 23

| B0  B11 | B12  B19 | B20 | B21  B24 | B25 | B26  B31 | B32  B38 | B39 | |
|---|---|---|---|---|---|---|---|---|
| Associated identifier 12 | RU allocation | Uplink FEC coding type | Uplink extremely high throughput modulation and coding scheme | Reserved | Spatial stream allocation/ random access resource unit information | Uplink target receive power | PS160 | Trigger dependent user information |
| 12 | 8 | 1 | 4 | 1 | 1 | 6 | 7 | Variable |

FIG. 25

| B0 | B11 B12 | B14 B15 | B16 B17 | B20 B21 | B24 B25 | B36 B37 | B39 | |
|---|---|---|---|---|---|---|---|---|
| Associated identifier 12 | Physical version identifier | Uplink bandwidth extension | Spatial reuse 1 | Spatial reuse 2 | Universal signal field | Reserved | Trigger dependent user information | |
| 12 | 3 | 2 | 4 | 4 | 12 | 3 | Variable | |

FIG. 26

CHANNEL ACCESS METHOD AND APPARATUS

CROSS-REFERENCE TO RELATED APPLICATIONS

This application is a continuation of International Application No. PCT/CN2022/104639, filed on Jul. 8, 2022, which claims priority to Chinese Patent Application No. 202110791172.5, filed on Jul. 13, 2021. The disclosures of the aforementioned applications are hereby incorporated by reference in their entireties.

TECHNICAL FIELD

This application relates to the field of communication technologies, and in particular, to a channel access method and apparatus.

BACKGROUND

A wireless local area network (WLAN) is a distributed communication technology for wireless transmission based on a carrier sense multiple access with collision avoidance (CSMA/CA) mechanism. All WLAN devices on the network can initiate a channel access process. Currently, a large quantity of latency-sensitive traffics exist on different access points (APs) on the WLAN. For example, the institute of electrical and electronics engineers (IEEE) 802.11 research group defines a plurality of low-latency scenarios, such as real-time online gaming, real-time video, industrial wireless, and uncrewed aerial vehicle control. A range of latencies required by these traffics is 1 ms to 100 ms. For these high-priority latency-sensitive traffics, contention and a collision occur in the channel access process, which affects quality of service (QoS) of the traffics.

SUMMARY

Embodiments of this application provide a channel access method and apparatus, to avoid contention and a collision generated by a plurality of APs in a channel access process, thereby improving quality of service of a traffic.

According to a first aspect, an embodiment of this application provides a channel access method. The method includes: A first device determines a first frame, where the first frame includes first indication information, the first indication information indicates a first AP in at least one access point AP to perform contention access for a first traffic in a first slot, and the first traffic includes a traffic for which channel access is performed by using a priority interframe space (PIFS); and sends the first frame to the first AP. Different slots are allocated to a plurality of APs, and the AP may obtain, in a slot corresponding to the AP, an opportunity of preferentially accessing a channel, to avoid contention and a collision generated by the plurality of APs in a channel access process, thereby improving quality of service of a traffic.

In one embodiment, the first indication information includes a slot interval of the first slot, duration of the first slot, and a start moment of the first slot. The slot interval of the first slot, the duration of the first slot, and the start moment of the first slot are indicated, so that the first AP can accurately perform contention access in the first slot.

In one embodiment, the first indication information further includes one or more of the following: a start moment of a beacon, a beacon interval, duration of a boundary guard interval, and a second slot, and the second slot is a reserved time window. In this way, the first AP accurately learns an allocation status of the slot, to ensure that the first AP accurately performs contention access in the first slot.

In one embodiment, the first device selects one AP from the at least one AP as a primary AP; and uses a timestamp of the primary AP as a first reference moment, and uses a time offset of the first slot of the first AP relative to the first reference moment as the start moment of the first slot. The first slot is allocated to the first AP by using the timestamp of the primary AP as the reference moment, to ensure time synchronization between the first AP and the primary AP, thereby improving accuracy of initiating contention access at the start moment of the first slot.

In one embodiment, the first indication information further includes the first reference moment. The first reference moment is indicated to the first AP, to ensure time synchronization between the first AP and the primary AP.

In one embodiment, the first device uses a local clock of the first device as a second reference moment, and uses a time offset of the first slot of the first AP relative to the second reference moment as a start moment of the first slot. The first slot is allocated to the first AP by using the local clock of the first device as the reference moment, to ensure time synchronization between the first AP and the first device, thereby improving accuracy of initiating contention access at the start moment of the first slot.

In one embodiment, the first device sends a second frame to the first AP, where the second frame indicates that the first AP is prohibited from performing contention access by using the PIFS. When an end moment of the first slot arrives, the first AP is prohibited from performing contention access by using the PIFS, to avoid contention and a collision between the first AP and another AP, thereby improving quality of service of a traffic.

According to a second aspect, an embodiment of this application provides a channel access method. The method includes: A first AP in at least one access point AP receives a first frame from a first device, where the first frame includes first indication information; and performs contention access for a first traffic in a first slot based on the first indication information, where the first traffic includes a traffic for which channel access is performed by using a priority interframe space PIFS. Different slots are allocated to a plurality of APs, and the AP may obtain, in a slot corresponding to the AP, an opportunity of preferentially accessing a channel, to avoid contention and a collision generated by the plurality of APs in a channel access process, thereby improving quality of service of a traffic.

In one embodiment, the first indication information includes a slot interval of the first slot, duration of the first slot, and a start moment of the first slot. The slot interval of the first slot, the duration of the first slot, and the start moment of the first slot are indicated, so that the first AP can accurately perform contention access in the first slot.

In one embodiment, the first indication information further includes one or more of the following: a start moment of a beacon, a beacon interval, duration of a boundary guard interval, and a second slot, and the second slot is a reserved time window. In this way, the first AP accurately learns an allocation status of the slot, to ensure that the first AP accurately performs contention access in the first slot.

In one embodiment, the start moment of the first slot is a time offset of the first slot of the first AP relative to a first reference moment, the first reference moment is a timestamp of a primary AP, and the primary AP is an AP selected from the at least one AP. The first slot is allocated to the first AP by using the timestamp of the primary AP as the reference moment, to ensure time synchronization between the first AP and the primary AP, thereby improving accuracy of initiating contention access at the start moment of the first slot.

In one embodiment, the first indication information further includes the first reference moment. The first reference moment is indicated to the first AP, to ensure time synchronization between the first AP and the primary AP.

In one embodiment, a start moment of the first slot is a time offset of the first slot of the first AP relative to a second reference moment, and the second reference moment is a local clock of the first device. The first slot is allocated to the first AP by using the local clock of the first device as the reference moment, to ensure time synchronization between the first AP and the first device, thereby improving accuracy of initiating contention access at the start moment of the first slot.

In one embodiment, the first AP receives a second frame from the first device, where the second frame indicates that the first AP is prohibited from performing contention access by using the PIFS. When an end moment of the first slot arrives, the first AP is prohibited from performing contention access by using the PIFS, to avoid contention and a collision between the first AP and another AP, thereby improving quality of service of a traffic.

According to a third aspect, an embodiment of this application provides a channel access method. The method includes: An access point AP generates a first trigger frame, where the first trigger frame includes a first field, the first field indicates a terminal device STA to report whether a first traffic exists, and the AP sends the first trigger frame to the STA, where the first traffic is a latency-sensitive traffic. The trigger frame is used to poll whether the terminal device has an uplink first traffic. Whether a plurality of terminal devices have uplink first traffics is polled at one time, so that traffic transmission efficiency can be improved when there are a large quantity of occasional first traffics on a network.

In one embodiment, the first traffic includes a traffic for which channel access is performed by using a priority interframe space PIFS.

In one embodiment, the AP accesses a channel in a first slot by using the PIFS.

In one embodiment, the first field is a feedback type field.

In one embodiment, the first trigger frame includes a common information field, and the common information field includes the first field.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the AP sends a second trigger frame to the STA, where the second trigger frame indicates to report a buffer size of the first traffic. The terminal device is accurately required to report a buffer status of the first traffic by using the trigger frame.

In one embodiment, the second trigger frame includes a common information field, the common information field includes a second field, and the second field indicates to report a buffer size of the first traffic.

In one embodiment, the second field is a high efficiency/extremely high throughput primary 160HE/EHT P160 field or a reserved field.

In one embodiment, the second field is B54 to B63 in the common information field, and one bit in B54 to B63 indicates to report a buffer size of the first traffic.

In one embodiment, the second trigger frame includes a user information field, the user information field includes a trigger dependent user information field, the trigger dependent user information field includes N bits, the N bits correspond to N traffic types, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the AP sends a third trigger frame to the STA, where the third trigger frame indicates to trigger the terminal device to send the first traffic. The terminal device is accurately triggered to send the first traffic, to avoid hybrid transmission between the first traffic and another traffic, and improve traffic transmission efficiency.

In one embodiment, the third trigger frame includes a user information field, the user information field includes a trigger dependent user information field, the trigger dependent user information field includes M bits, the M bits correspond to M traffic types, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

According to a fourth aspect, an embodiment of this application provides a channel access method. The method includes: A terminal device STA receives a first trigger frame from an access point AP, where the first trigger frame includes a first field; and reports, to the STA based on the first field, whether a first traffic exists, where the first traffic is a latency-sensitive traffic. The AP polls, by using the trigger frame, whether the terminal device has an uplink first traffic. Whether a plurality of terminal devices have uplink first traffics is polled at one time, so that traffic transmission efficiency can be improved when there are a large quantity of occasional first traffics on a network.

In one embodiment, the first traffic includes a traffic for which channel access is performed by using a priority interframe space PIFS.

In one embodiment, the first field is a feedback type field.

In one embodiment, the first trigger frame includes a common information field, and the common information field includes the first field.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the STA receives a second trigger frame from the AP, where the second trigger frame indicates to report a buffer size of the first traffic. The terminal device is accurately required to report a buffer status of the first traffic by using the trigger frame.

In one embodiment, the second trigger frame includes a common information field, the common information field includes a second field, and the second field indicates to report a buffer size of the first traffic.

In one embodiment, the second field is a high efficiency/extremely high throughput primary 160HE/EHT P160 field or a reserved field.

In one embodiment, the second field is B54 to B63 in the common information field, and one bit in B54 to B63 indicates to report a buffer size of the first traffic.

In one embodiment, the second trigger frame includes a user information field, the user information field includes a trigger dependent user information field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the STA receives a third trigger frame from the AP, where the third trigger frame indicates to trigger the terminal device to send the first traffic. The terminal device is accurately triggered to send the first traffic, to avoid hybrid transmission between the first traffic and another traffic, and improve traffic transmission efficiency.

In one embodiment, the third trigger frame includes a user information field, the user information field includes a trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

According to a fifth aspect, an embodiment of this application provides a channel access apparatus. The apparatus includes: a processing module, configured to determine a first frame, where the first frame includes first indication information, the first indication information indicates a first AP in at least one access point AP to perform contention access for a first traffic in a first slot, and the first traffic includes a traffic for which channel access is performed by using a priority interframe space PIFS; and a sending module, configured to send the first frame to the first AP.

In one embodiment, the first indication information includes a slot interval of the first slot, duration of the first slot, and a start moment of the first slot.

In one embodiment, the first indication information further includes one or more of the following: a start moment of a beacon, a beacon interval, duration of a boundary guard interval, and a second slot, and the second slot is a reserved time window.

In one embodiment, the processing module is further configured to: select one AP from the at least one AP as a primary AP; and use a timestamp of the primary AP as a first reference moment, and use a time offset of the first slot of the first AP relative to the first reference moment as the start moment of the first slot.

In one embodiment, the first indication information further includes the first reference moment.

In one embodiment, the processing module is further configured to: use a local clock of the first device as a second reference moment, and use a time offset of the first slot of the first AP relative to the second reference moment as a start moment of the first slot.

In one embodiment, the sending module is further configured to send a second frame to the first AP, where the second frame indicates that the first AP is prohibited from performing contention access by using the PIFS.

For operations performed by the channel access apparatus and beneficial effects thereof, refer to the method in the first aspect and the beneficial effects thereof. Repeated parts are not described again.

According to a sixth aspect, an embodiment of this application provides a channel access apparatus. The apparatus includes: a receiving module, configured to receive a first frame from a first device, where the first frame includes first indication information; and a processing module, configured to perform contention access for a first traffic in a first slot based on the first indication information, where the first traffic includes a traffic for which channel access is performed by using a priority interframe space PIFS.

In one embodiment, the first indication information includes a slot interval of the first slot, duration of the first slot, and a start moment of the first slot.

In one embodiment, the first indication information further includes one or more of the following: a start moment of a beacon, a beacon interval, duration of a boundary guard interval, and a second slot, and the second slot is a reserved time window.

In one embodiment, the start moment of the first slot is a time offset of the first slot of the first AP relative to a first reference moment, the first reference moment is a timestamp of a primary AP, and the primary AP is an AP selected from a plurality of APs.

In one embodiment, the first indication information further includes the first reference moment.

In one embodiment, a start moment of the first slot is a time offset of the first slot of the first AP relative to a second reference moment, and the second reference moment is a local clock of the first device.

In one embodiment, the receiving module is further configured to receive a second frame from the first device, where the second frame indicates that the first AP is prohibited from performing contention access by using the PIFS.

For operations performed by the channel access apparatus and beneficial effects thereof, refer to the method in the second aspect and the beneficial effects thereof. Repeated parts are not described again.

According to a seventh aspect, an embodiment of this application provides a channel access apparatus. The apparatus includes:

a processing module, configured to generate a first trigger frame, where the first trigger frame includes a first field, the first field indicates a terminal device STA to report whether a first traffic exists, and the first traffic is a latency-sensitive traffic; and a sending module, configured to send the first trigger frame to the STA.

In one embodiment, the first traffic includes a traffic for which channel access is performed by using a priority interframe space PIFS.

In one embodiment, the first field is a feedback type field.

In one embodiment, the first trigger frame includes a common information field, and the common information field includes the first field.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the sending module is further configured to send a second trigger frame to the STA, where the second trigger frame indicates to report a buffer size of the first traffic.

In one embodiment, the second trigger frame includes a common information field, the common information field includes a second field, and the second field indicates to report a buffer size of the first traffic.

In one embodiment, the second field is a high efficiency/extremely high throughput primary 160HE/EHT P160 field or a reserved field.

In one embodiment, the second field is B54 to B63 in the common information field, and one bit in B54 to B63 indicates to report a buffer size of the first traffic.

In one embodiment, the second trigger frame includes a user information field, the user information field includes a trigger dependent user information field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the sending module is further configured to send a third trigger frame to the STA, where the third trigger frame indicates to trigger the terminal device to send the first traffic.

In one embodiment, the third trigger frame includes a user information field, the user information field includes a trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

For operations performed by the channel access apparatus and beneficial effects thereof, refer to the method in the third aspect and the beneficial effects thereof. Repeated parts are not described again.

According to an eighth aspect, an embodiment of this application provides a channel access apparatus. The apparatus includes: a receiving module, configured to receive a first trigger frame from an access point AP, where the first trigger frame includes a first field; and a sending module, configured to report, to the STA based on the first field, whether a first traffic exists, where the first traffic is a latency-sensitive traffic.

In one embodiment, the first traffic includes a traffic for which channel access is performed by using a priority interframe space PIFS.

In one embodiment, the first field is a feedback type field.

In one embodiment, the first trigger frame includes a common information field, and the common information field includes the first field.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the receiving module is further configured to receive a second trigger frame from the AP, where the second trigger frame indicates to report a buffer size of the first traffic.

In one embodiment, the second trigger frame includes a common information field, the common information field includes a second field, and the second field indicates to report a buffer size of the first traffic.

In one embodiment, the second field is a high efficiency/extremely high throughput primary 160HE/EHT P160 field or a reserved field.

In one embodiment, the second field is B54 to B63 in the common information field, and one bit in B54 to B63 indicates to report a buffer size of the first traffic.

In one embodiment, the second trigger frame includes a user information field, the user information field includes a trigger dependent user information field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the receiving module is further configured to receive a third trigger frame from the AP, where the third trigger frame indicates to trigger the terminal device to send the first traffic.

In one embodiment, the third trigger frame includes a user information field, the user information field includes a trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

For operations performed by the channel access apparatus and beneficial effects thereof, refer to the method in the fourth aspect and the beneficial effects thereof. Repeated parts are not described again.

According to a ninth aspect, an embodiment of this application provides a channel access apparatus. The channel access apparatus is configured to implement the method and the function performed by the first device in the first aspect, and is implemented by hardware/software. The hardware/software includes a module corresponding to the function.

According to a tenth aspect, an embodiment of this application provides a channel access apparatus. The channel access apparatus is configured to implement the method and the function performed by the first AP in the second aspect, and is implemented by hardware/software. The hardware/software includes a module corresponding to the function.

According to an eleventh aspect, an embodiment of this application provides a channel access apparatus. The channel access apparatus is configured to implement the method and the function performed by the AP in the third aspect, and is implemented by hardware/software. The hardware/software includes a module corresponding to the function.

According to a twelfth aspect, an embodiment of this application provides a channel access apparatus. The channel access apparatus is configured to implement the method and the function performed by the terminal device in the fourth aspect, and is implemented by hardware/software. The hardware/software includes a module corresponding to the function.

According to a thirteenth aspect, this application provides a channel access apparatus. The apparatus may be a first device, or may be an apparatus in the first device, or may be an apparatus that can be used together with the first device. The channel access apparatus may alternatively be a chip system. The channel access apparatus may perform the method in the first aspect. A function of the channel access apparatus may be implemented by using hardware, or may be implemented by executing corresponding software by hardware. The hardware or the software includes one or more modules corresponding to the foregoing functions. The module may be software and/or hardware. For operations performed by the channel access apparatus and beneficial effects thereof, refer to the method in the first aspect and the beneficial effects thereof. Repeated parts are not described again.

According to a fourteenth aspect, this application provides a channel access apparatus. The apparatus may be a first AP, or may be an apparatus in the first AP, or may be an apparatus that can be used together with the first AP. The channel access apparatus may alternatively be a chip system. The channel access apparatus may perform the method in the second aspect. A function of the channel access apparatus may be implemented by using hardware, or may be implemented by executing corresponding software by hardware. The hardware or the software includes one or more modules corresponding to the foregoing functions. The module may be software and/or hardware. For operations performed by the channel access apparatus and beneficial effects thereof, refer to the method in the second aspect and the beneficial effects thereof. Repeated parts are not described again.

According to a fifteenth aspect, this application provides a channel access apparatus. The apparatus may be an AP, or may be an apparatus in the AP, or may be an apparatus that can be used together with the AP. The channel access apparatus may alternatively be a chip system. The channel access apparatus may perform the method in the third aspect. A function of the channel access apparatus may be implemented by using hardware, or may be implemented by executing corresponding software by hardware. The hardware or the software includes one or more modules corresponding to the foregoing functions. The module may be software and/or hardware. For operations performed by the channel access apparatus and beneficial effects thereof, refer to the method in the third aspect and the beneficial effects thereof. Repeated parts are not described again.

According to a sixteenth aspect, this application provides a channel access apparatus. The apparatus may be a terminal device, or may be an apparatus in the terminal device, or may be an apparatus that can be used together with the terminal device. The channel access apparatus may alternatively be a chip system. The channel access apparatus may perform the method in the fourth aspect. A function of the channel access apparatus may be implemented by using hardware, or may be implemented by executing corresponding software by hardware. The hardware or the software includes one or more modules corresponding to the foregoing functions. The module may be software and/or hardware. For operations performed by the channel access apparatus and beneficial effects thereof, refer to the method in the fourth aspect and the beneficial effects thereof. Repeated parts are not described again.

According to a seventeenth aspect, this application provides a channel access apparatus. The channel access apparatus includes a processor, and when the processor invokes a computer program in a memory, the method in any one of the first aspect to the fourth aspect is performed.

According to an eighteenth aspect, this application provides a channel access apparatus. The channel access apparatus includes a processor and a memory, the memory is configured to store a computer program, and the processor is configured to execute the computer program stored in the memory, so that the channel access apparatus performs the method in any one of the first aspect to the fourth aspect.

According to a nineteenth aspect, this application provides a channel access apparatus. The channel access apparatus includes a processor, a memory, and a transceiver, the transceiver is configured to receive a signal or send a signal, the memory is configured to store a computer program, and the processor is configured to invoke the computer program from the memory to perform the method in any one of the first aspect to the fourth aspect.

According to a twentieth aspect, this application provides a channel access apparatus. The channel access apparatus includes a processor and an interface circuit, and the interface circuit is configured to receive a computer program and transmit the computer program to the processor, and the processor runs the computer program to perform the method in any one of the first aspect to the fourth aspect.

According to a twenty-first aspect, this application provides a computer-readable storage medium. The computer-readable storage medium is configured to store a computer program, and when the computer program is executed, the method in any one of the first aspect to the fourth aspect is implemented.

According to a twenty-second aspect, this application provides a computer program product including a computer program. When the computer program is executed, the method in any one of the first aspect to the fourth aspect is implemented.

According to a twenty-third aspect, an embodiment of this application provides a communication system. The communication system includes at least one first device, at least one AP, and at least one terminal device, the first device is configured to perform the operations in the first aspect, the AP is configured to perform the operations in the second aspect and the third aspect, and the terminal device is configured to perform the operations in the fourth aspect.

According to a twenty-fourth aspect, an embodiment of this application provides a chip or a chip system. The chip or the chip system includes a processor, configured to support a first device, an AP, or a terminal device to implement a function in any one of the first aspect to the fourth aspect.

BRIEF DESCRIPTION OF DRAWINGS

To describe the technical solutions in embodiments of this application or in the background more clearly, the following describes the accompanying drawings for describing embodiments of this application or the background.

FIG. 6 is a schematic flowchart of a channel access method according to an embodiment of this application;

FIG. 7 is a schematic diagram of slot allocation;

FIG. 8 is a schematic diagram of performing channel access by using a CAPWAP control frame;

FIG. 14 is another schematic diagram of slot allocation of each AP in one slot interval;

FIG. 18 is a schematic flowchart of a channel access method according to an embodiment of this application;

FIG. 19 is a schematic diagram of slot allocation of each AP in one slot interval;

FIG. 23 is a schematic diagram of a frame format of an NDP feedback frame;

FIG. 25 is a schematic diagram of a user information field in a BSRP trigger;

FIG. 26 is a schematic diagram of a special user information field in a BSRP trigger;

DESCRIPTION OF EMBODIMENTS

The following describes embodiments of this application with reference to the accompanying drawings in embodiments of this application.

In this application, the first device may be a device that is located on a network side of the foregoing communication system and that has a wireless receiving and sending function, or a chip or a chip system that may be disposed in the device, and may provide a wireless communication function for another device in the communication system. The first device may be a control device, and the control device may be a collaborative control node, an access controller AC, or the like. The first device may also be a primary AP, and the primary AP is one AP selected from a plurality of APs. The first device includes but is not limited to: an access point (AP) in a wireless fidelity (Wi-Fi) system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (TP, or transmission reception point (TRP)), or the like. The first device may alternatively be a gNB or a transmission point (TRP or TP) in a 5G system, for example, a new radio (NR) system, or one antenna panel or a group of antenna panels (including a plurality of antenna panels) of a base station in a 5G system. The first device may alternatively be a network node, such as a baseband unit (BBU), a distributed unit (DU), or a road side unit (RSU) having a base station function, that constitutes a gNB or a transmission point.

Figures 1, 2:
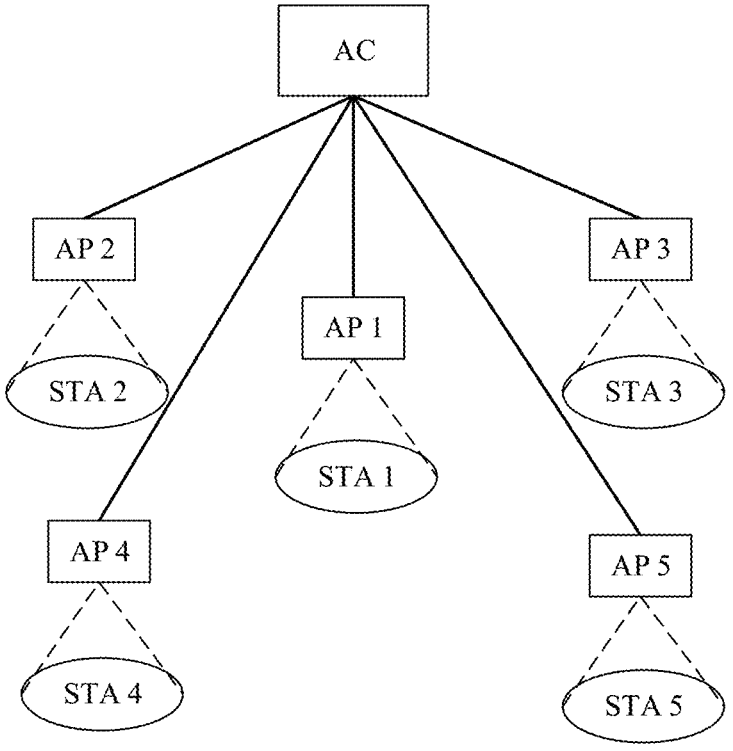
FIG. 1 is a schematic diagram of a structure of a communication system according to an embodiment of this application.
FIG. 2 is a schematic diagram of a relationship between a backoff window of a WLAN device and retransmissions.

FIG. 1 is a schematic diagram of a structure of a communication system according to an embodiment of this application. The communication system includes one access controller (AC), one or more access points (AP), and one or more stations (STA). One AP corresponds to one or more STAs. FIG. 1 shows an example in which one AC communicates with five APs (an AP 1, an AP 2, an AP 3, an AP 4, and an AP 5), and one AP communicates with one STA (the AP 1 communicates with a STA 1, the AP 2 communicates with a STA 2, the AP 3 communicates with a STA 3, the AP 4 communicates with a STA 4, and the AP 5 communicates with a STA 5). On a WLAN, a plurality of intra-frequency APs can exist, and all APs each can be connected to the AC through a wired network.

The AC may be a collaborative control node. In one embodiment, the AP may be an access point used by a mobile subscriber to access a wired network, and is mainly deployed in a home, inside a building, and insider a campus, with a typical coverage radius of tens of meters to hundreds of meters. Certainly, the access point may alternatively be deployed outdoors. The AP is equivalent to a bridge that connects a wired network and a wireless network. The AP is mainly used to connect wireless network clients to each other, and then connect the wireless network to the Ethernet. The AP may be a terminal device with a Wi-Fi chip or a first AP. The AP may be a device of a standard such as 801.11be or a next-generation Wi-Fi standard. Alternatively, the AP may be a device that supports a plurality of wireless local area network (WLAN) standards such as 802.11ax, 802.11ac, 802.11n, 802.11g, 802.11b, and 802.11a.

The STA may be a terminal device that has an uplink or downlink low-latency traffic. The STA may also be a wireless communication chip, a wireless sensor, or a wireless communication terminal, for example, a mobile phone that supports a Wi-Fi communication function, a tablet computer that supports a Wi-Fi communication function, a set-top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. Optional, the STA may support a standard such as 801.11be or a next-generation Wi-Fi standard. The STA may also support a plurality of WLAN standards such as 802.11ax, 802.11ac, 802.11n, 802.11g, 802.11b, and 802.11a.

The STA may also be referred to as a terminal device, user equipment (UE), a user apparatus, an access terminal, a user unit, a user station, a mobile station (MS), a remote station, a remote terminal, a mobile device, a user terminal, a terminal, a terminal unit, a terminal station, a terminal apparatus, a wireless communication device, a user agent, or a user apparatus. The STA may communicate with an access point (AP) MLD or another STA MLD or a single-link device. For example, the STA may be any communication device that can communicate with an access point (AP) and communicate with the WLAN.

For example, the STA in embodiments of this application may be a mobile phone, a wireless data card, a personal digital assistant (PDA) computer, a laptop computer, a tablet computer (Pad), an ultra-mobile personal computer (UMPC), a netbook, a computer with a wireless transceiver function, a machine type communication (MTC) terminal, a virtual reality (VR) terminal device, an augmented reality (AR) terminal device, an internet of things (IoT) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city (such as a smart water meter, a smart electricity meter, and a smart air detection node), a wireless terminal in smart home (for example, a game console, a projector, a smart camera, a smart television, a smart speaker, a smart refrigerator, and fitness equipment), a vehicle-mounted terminal, and an RSU having a terminal function. The access terminal may be a cellular phone, a cordless phone, a session initiation protocol (SIP) phone, a wireless local loop (WLL) station, a personal digital assistant (PDA), a handheld device (handset) with a wireless communication function, a computing device, another processing device connected to a wireless modem, a wearable device, or the like.

For another example, the STA in embodiments of this application may be an express delivery terminal in smart logistics (for example, a device that can monitor a position of a goods vehicle and a device that can monitor a temperature and a humidity of goods), a wireless terminal in smart agriculture (for example, a wearable device that can collect related data of poultry and animals), a wireless terminal in smart buildings (for example, a smart elevator, a fire monitoring device, and a smart electricity meter), a wireless terminal in smart healthcare (for example, a wearable device that can monitor physiological statuses of people or animals), a wireless terminal in smart transportation (for example, a smart bus, a smart vehicle, a shared bicycle, a charging pile monitoring device, a smart traffic light, smart monitoring, and a smart parking device), a wireless terminal in smart retail (for example, a vending machine, a self-service checkout machine, a unmanned convenience store, a self-service dining machine, and a self-service navigation console in a shopping mall), a wireless terminal in smart office (for example, a printer and a projector). For another example, the STA in this application may be a vehicle-mounted module, an automobile module, an onboard component, an automotive chip, or an on board unit that is built in a vehicle as one or more components or units. The vehicle may implement a method provided in this application by using the vehicle-mounted module, the automobile module, the onboard component, the automotive chip, or the on board unit that is built in the vehicle.

It should be noted that, the solutions in embodiments of this application may also be used in another communication system, and a corresponding name may also be replaced with a name of a corresponding function in the another communication system. In addition, a person of ordinary skill in the art may learn that the technical solutions provided in embodiments of this application are also applicable to a similar technical problem as a network architecture evolves and anew service scenario emerges.

All WLAN devices on the network each can actively initiate a channel access process. Before sending data, the WLAN device monitors a channel status first. When detecting that the channel is idle for a period longer than distributed coordination function (DCF) interframe space (DIFS) time, the WLAN device selects a random backoff value from a backoff window. The random backoff value is decreased by 1 every time the channel is idle for one slot time (aSlotTime) (usually 9 microseconds). When the random backoff value is decreased to 0, the WLAN device starts to send the data. When there are a large quantity of users on the WLAN, the plurality of users may simultaneously initiate CSMA/CA-based channel access processes, and a collision may still occur. In other words, two or more WLAN devices select to send data at a same moment (for example, a moment when selected random numbers are the same). After the collision, the WLAN device selects to exponentially increase the backoff window, to reduce an occurrence probability of a collision during next channel access. FIG. 2 is a schematic diagram of a relationship between a backoff window of a WLAN device and retransmissions. For the first retransmission after the collision, the backoff window is [0, 567] μs. For the second retransmission after the collision, the backoff window is [0, 1143] s. The backoff window increases exponentially. It should be noted that, when there are more users on the network, a collision probability is higher, an average backoff window is larger, and channel access time is longer. Generally, there is more than one WLAN in an office or home indoor environment, and there is also a contention relationship between these intra-frequency WLAN.

Figure 3:
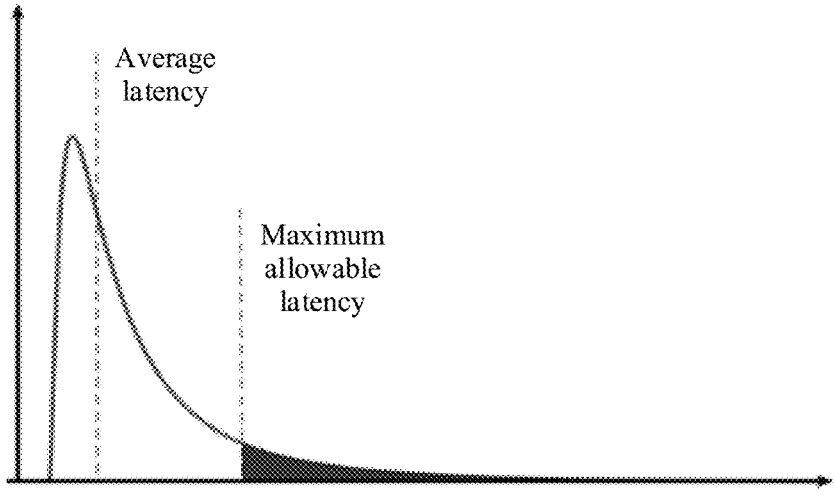
FIG. 3 is a channel access latency probability distribution diagram.

FIG. 3 is a channel access latency probability distribution diagram. When WLAN devices contend for a channel, a channel access latency of a data packet is generated. Due to uncertainty of the latency, the channel access latency of the data packet on a WLAN air interface is in long tail distribution. Access latencies of most data packets each are less than an average latency, and access latencies of a few data packets are very long. For a traffic with a maximum latency constraint, this part of data packets cannot meet a traffic requirement, and consequently traffic performance experience deteriorates.

IEEE 802.11 introduces an enhanced distributed access (EDCA) contention queue. A range of maximum values of a contention window (CW) and a range of minimum values of the contention window are reduced, so that a probability that a high-priority traffic obtains the channel through contention is increased, thereby providing QoS guarantee for the high-priority traffic. For example, a value range of the CW for a highest-priority voice queue is [7, 15]. A value range of the CW for a second-highest-priority video queue is [15, 31]. However, currently, a large quantity of latency-sensitive traffics exist on different APs on the WLAN. For example, the IEEE 802.11 research group defines a plurality of low-latency scenarios, such as real-time online gaming, real-time video, industrial wireless, and uncrewed aerial vehicle control. A range of latencies required by these traffics is 1 ms to 100 ms. Contention and a collision between these high-priority traffics still exist. In addition, decreasing of the contention window causes more frequent collisions between the high-priority traffics.

The following provides two methods for resolving the traffic collision.

Figure 4:
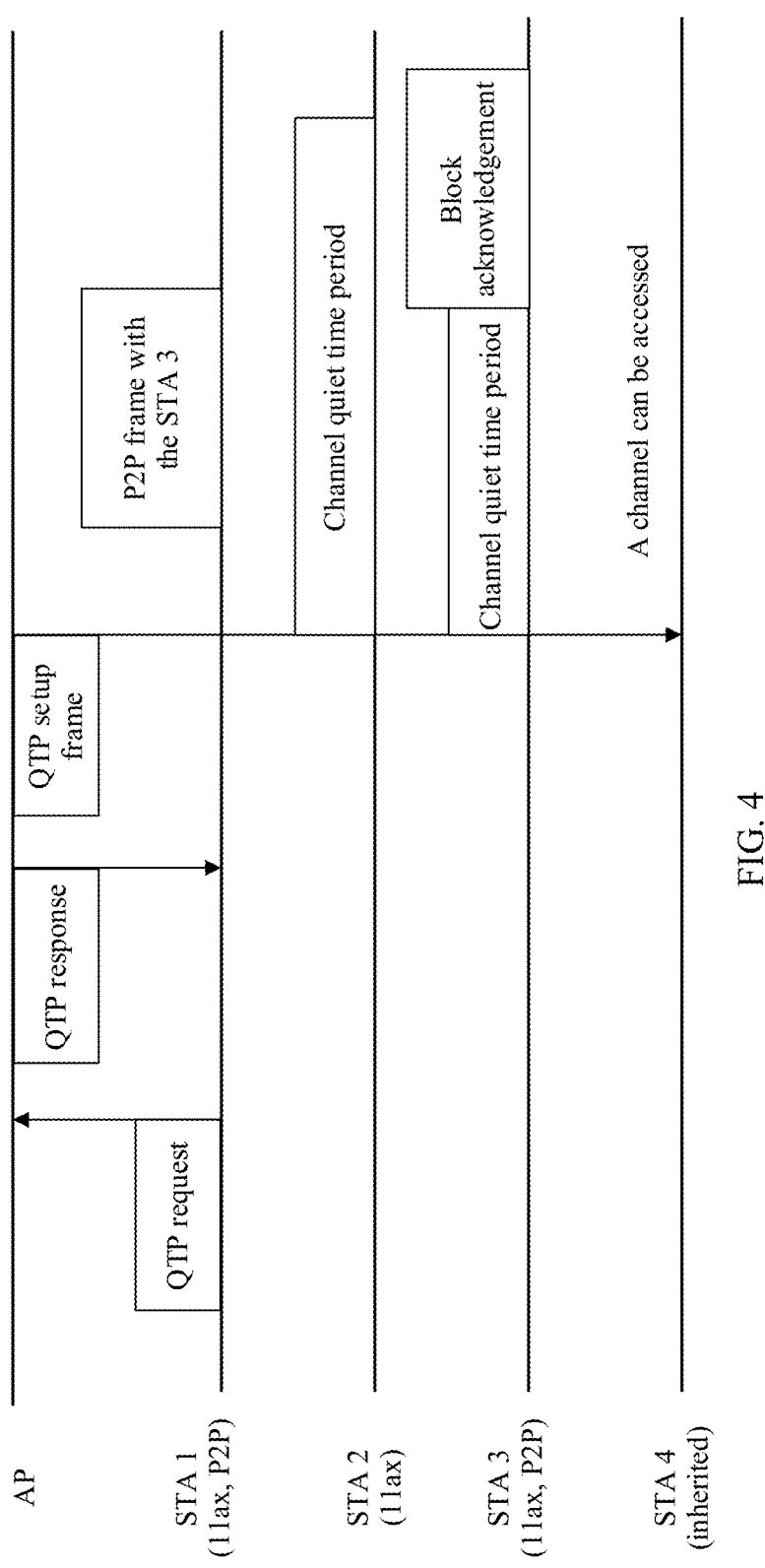
FIG. 4 is a schematic diagram of P2P communication based on channel quiet time period protection.

In 802.11ax, a method for reducing a peer to peer (P2P) or ad hoc communication collision is proposed. Because a common terminal cannot understand scheduling information of P2P communication, interference may exist between two different systems. FIG. 4 is a schematic diagram of P2P communication based on channel quiet time period (QTP) protection. A terminal that participates in both P2P communication and AP-STA communication may send a QTP request to an HE AP before initiating P2P communication. After receiving the QTP request, the AP sends QTP setup frames to all other high-efficiency (HE) terminal devices.

The HE terminal device that receives the QTP setup frame may select to back off in a subsequent period of time, to avoid a collision with P2P communication.

However, the mechanism does not force the terminal to be quiet, but only notifies the HE terminal device that a P2P traffic occurs in the channel quiet time. In this time period, the HE terminal device may select to back off, or may continue to use the channel. Because active backoff may prolong channel access time of the terminal, most terminals do not select to back off. This mechanism needs to be temporarily established each time P2P communication occurs, and the QTP request can be sent only after the terminal device obtains the channel through CSMA contention. Therefore, when network quality is poor, the latency is still not ensured.

Figure 5:
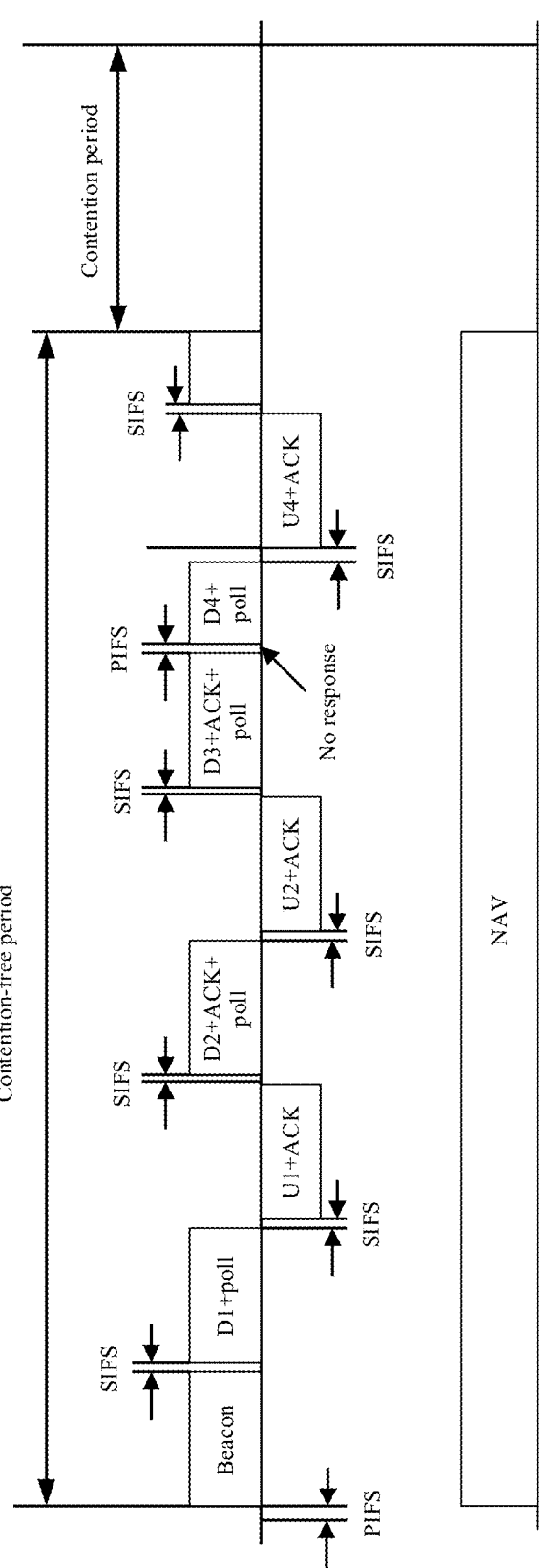
FIG. 5 is a schematic diagram of an HCCA channel access manner.

The 802.11 standard defines a hybrid coordination function (HCF) channel access function. The HCF includes two channel access mechanisms: hybrid control access (HCCA) and enhanced distributed access (EDCA). The EDCA is a contention-based manner in which a channel is used in a contention period. The HCCA is a scheduling-based contention-free access mechanism. FIG. 5 is a schematic diagram of an HCCA channel access manner. A contention-free period and a contention period are obtained through division in target beacon transmission time (TBTT), to realize coexistence of the two access mechanisms. A beacon sent by the AP is used as a reference moment, and a period of time after the beacon is set as a contention-free period. All terminal devices do not participate in contenting, and the AP performs polling in a contention-free poll (CF-Poll) manner.

In the contention-free period, all the terminal devices do not contend for using the channel, and only the AP schedules uplink and downlink sending of the terminal device in the HCCA scheduling manner. Therefore, contention-free scheduling in a cell can be implemented, and a low-latency traffic is received and sent in a scheduling manner, thereby avoiding a jitter of the channel access latency. However, the contention-free period of the HCCA is long, and is related to a beacon interval, and is usually at a level of 100 ms. Therefore, the HCCA is not suitable for a traffic having a higher latency requirement.

To resolve the foregoing technical problems, embodiments of this application provide the following solutions.

FIG. 6 is a schematic flowchart of a channel access method according to an embodiment of this application. This embodiment of this application includes at least the following operations.

S601: A first device determines a first frame, where the first frame includes first indication information. The first indication information indicates a first AP in at least one access point AP to perform contention access for a first traffic in a first slot, and the first traffic includes a traffic for which channel access is performed by using a priority interframe space (PIFS).

The first traffic may be a traffic having a high latency requirement, and a range of latencies required by the first traffic is 1 ms to 100 ms. In one embodiment, the first traffic may be referred to as a low-latency traffic, or may be referred to as a latency-sensitive traffic.

The first device may be a control device, and the control device may be a collaborative control node, an access controller AC, or the like. The first device may also be a primary AP, and the primary AP is one AP selected from a plurality of APs.

S602: The first device sends the first frame to the first AP.

The first device may allocate a plurality of slots to a plurality of APs in one slot interval, and one AP corresponds to one slot. The first slot in the plurality of slots is a slot allocated by the first device to the first AP The first AP in the plurality of APs performs channel access in the slot of the first AP by using the PIFS. If another AP in the plurality of APs does not perform channel access in a slot corresponding to the another AP by using the PIFS, the first AP may also perform channel access in the slot of the another AP in an enhanced distributed access EDCA manner. The first AP is any AP in the plurality of APs. The plurality of slots may be referred to as PIFS contention slots.

For example, FIG. 7 is a schematic diagram of slot allocation. There are five intra-frequency APs (an AP 1, an AP 2, an AP 3, an AP 4, and an AP 5) on a WLAN. The AC allocates different slots to the five APs. The AP 1 corresponds to a slot 1, and the AP 1 may preferentially perform contention access in the slot 1. The AP 2 corresponds to a slot 2, and the AP 2 may preferentially perform contention access in the slot 2. The AP 3 corresponds to a slot 3, and the AP 3 may preferentially perform contention access in the slot 3. The AP 4 corresponds to a slot 4, and the AP 4 preferentially perform contention access in the slot 4. The AP 5 corresponds to a slot 5, and the AP 5 may preferentially perform contention access in the slot 5.

In one embodiment, the first device may configure a start moment of the first slot for the first AP in the plurality of APs. The start moment of the first slot is a time offset of the first slot of the first AP relative to a first reference moment, the first reference moment is a timestamp of a primary AP, and the primary AP is an AP selected from the at least one AP. Alternatively, a start moment of the first slot is a time offset of the first slot of the first AP relative to a second reference moment, and the second reference moment is a local clock of the first device.

In one embodiment, the first device may configure duration of the first slot and an interval of the first slot for the first AP in the plurality of APs. For example, if the duration of the first slot is configured to be 1 ms, the first AP obtains a channel access opportunity once every 5 ms (that is, the interval of the first slot is 5 ms). If the duration of the first slot is configured to be 2 ms, the first AP obtains a channel access opportunity once every 10 ms (that is, the interval of the first slot is 10 ms).

In this embodiment of this application, the first frame may include the following two forms.

In an optional manner, when the timestamp of the primary AP is used as the first reference moment, the first indication information in the first frame may include the slot interval of the first slot, the duration of the first slot, and the start moment of the first slot. In one embodiment, the first indication information may further include the first reference moment. After receiving the first frame, the first AP determines an absolute start moment based on the first reference moment and the start moment of the first slot. When the absolute start moment arrives, contention access starts to be performed in the first slot allocated by the AC to the first AP. Then, after the duration of the first slot expires, the first AP is prohibited from performing contention access in the first slot. Finally, after the slot interval of the first slot expires, the first AP may start to perform contention access in the first slot again.

In one embodiment, the first indication information further includes one or more of the following: a start moment of a beacon, a beacon interval, duration of a boundary guard interval, and a second slot, and the second slot is a reserved time window. The second slot is used to send a beacon, a data frame, a control frame, another management frame, or the like.

In one embodiment, the first indication information may further include target beacon transmission time (TBTT) and a transmission opportunity (TXOP) that are of each AP.

In another optional manner, the local lock of the first device is used as the second reference moment. When the first device determines that the start moment of the first slot of the first AP arrives, the first device sends the first frame to the first AP. The first frame indicates the first AP to perform contention access for the first traffic in the first slot.

In one embodiment, when the first device determines that an end moment of the first slot of the first AP arrives, the first device sends a second frame to the first AP, where the second frame indicates that the first AP is prohibited from performing contention access by using the PIFS.

The AP and the AC are connected in a wired manner, the AP and the AC may communicate with each other by using a wired frame, and the first frame and the second frame may be wired frames. The wired frame may be a control and provisioning of wireless access points (CAPWAP) control frame, and an enable/disable message and an acknowledgement (ACK) message for channel access by using the PIFS are transferred by using a vendor-specific payload field in a message element field in the control frame.

FIG. 8 is a schematic diagram of performing channel access by using a CAPWAP control frame. The AC allocates different slots to the AP 1, the AP 2, the AP 3, and the AP 4 in one slot interval, where the AP 1 corresponds to a slot 1, the AP 2 corresponds to a slot 2, the AP 3 corresponds to a slot 3, and the AP 4 corresponds to a slot 4. When a start moment of the slot of the AP 1 arrives, the AC sends a first wired frame to the AP 1, to indicate that the AP 1 may perform contention access in the slot 1. After the AP 1 performs contention access in the slot 1, the AP 1 may return an ACK message to the AC. When an end moment of the slot 1 of the AP 1 arrives, the AC sends a second wired frame to the AP 1, to indicate that the AP 1 is prohibited from performing contention access in the slot 1. After the AP 1 is prohibited from performing contention access in the slot 1, the AP 1 may return an ACK message to the AC. A slot of another AP is similar to this. Details are not described herein.

S603: The first AP performs contention access for the first traffic in the first slot based on the first indication information, where the first traffic includes a traffic for which channel access is performed by using the PIFS.

Figures 9, 10, 11:
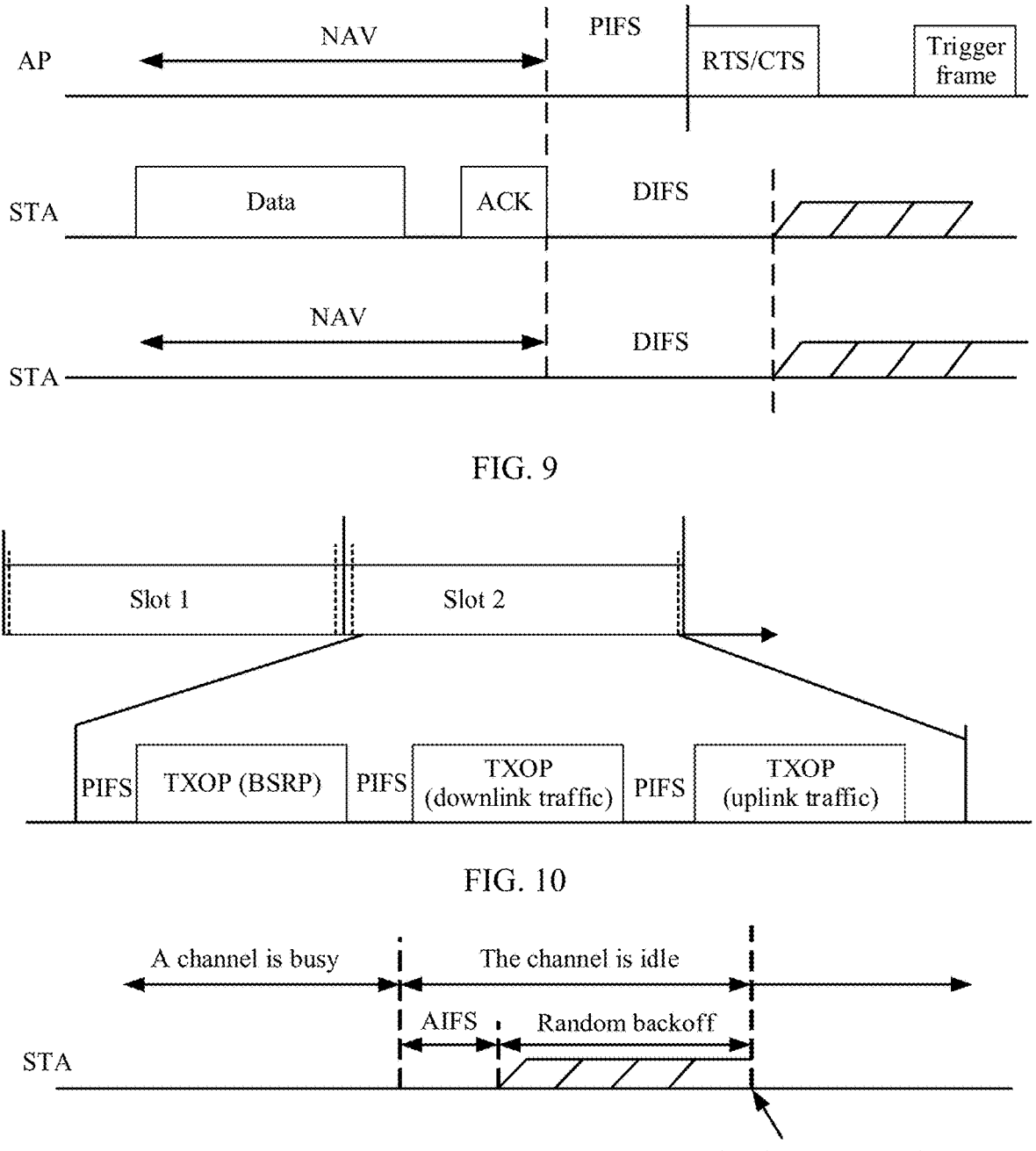
FIG. 9 is a schematic diagram of performing channel access by using a PIFS according to an embodiment of this application.
FIG. 10 is a schematic diagram of transmission performed by an AP in a slot in a plurality of TXOPs.
FIG. 11 is a schematic diagram of performing channel access and channel contention by a WLAN device.

FIG. 9 is a schematic diagram of performing channel access by using a PIFS according to an embodiment of this application. When the AP is allowed to use the PIFS to perform channel access, a clear channel assessment (CCA) module of the AP immediately performs channel access after the PIFS after detecting that a channel changes from busy to idle. Correspondingly, when the channel changes from busy to idle, the terminal device needs to wait at least time of a DIFS or an arbitration interframe space (AIFS) (an arbitration interframe space number (AIFSN) is at least 2) before starting backoff, and can start to occupy the channel until a backoff counter is decreased to zero. Because duration of the PIFS is less than the DIFS or the AIFS (the AIFSN is at least 2), it can be ensured that the AP can access the channel and obtain ownership of the channel before all STAs.

In one embodiment, after obtaining the channel by using the PIFS, the AP may send a request to send/clear to send (RTS/CTS) to a terminal device STA, where the RTS/CTS is used to notify that the channel is occupied. In one embodiment, if a plurality of terminals each have a first traffic, the AP may send multi-user request to send/clear to send (MU-RTS/CTS) frames to the plurality of terminals. Network allocation vector (NAV) protection is implemented on the channel to avoid a collision with the terminal device. In addition, the AP may determine whether the channel is obtained. If the AP does not receive the CTS sent by the terminal device, the AP considers that the channel fails to be occupied. After an RTS timer expires, if the AP detects that the channel is idle in the duration of the PIFS, the AP accesses the channel again.

In one embodiment, after obtaining the channel by using the PIFS, the AP may send the first traffic to the terminal device in a transmission opportunity (TXOP), or may schedule an uplink traffic (for example, a latency-sensitive traffic) of the terminal device in the TXOP.

In one embodiment, after performing channel access by using the PIFS to obtain the channel, the AP may complete uplink and downlink traffic transmission in one TXOP in the first slot, or complete uplink and downlink traffic transmission in a plurality of TXOPs, where the plurality of TXOPs are separated by using the PIFS.

For example, FIG. 10 is a schematic diagram of transmission performed by an AP in a slot in a plurality of TXOPs. The AP accesses a channel in a slot 2, and the slot 2 includes three TXOPs. The AP may transmit a buffer status report poll (BSRP) frame in the first TXOP, may transmit a downlink traffic in the second TXOP, and may transmit an uplink traffic in the third TXOP. The first TXOP, the second TXOP, and the third TXOP are separated by using the PIFSs.

In one embodiment, after the AP performs channel access in the first slot by using the PIFS to obtain the channel, the AP may configure a transmission opportunity (TXOP) limit and/or an AIFSN of the AP, and modify a contention parameter of an EDCA queue (a traffic that accesses the channel in the EDCA manner). Alternatively, an association request frame or an association response frame may be sent to the terminal device, where the association request frame or the association response frame includes a TXOP limit and/or an AIFSN, and a contention parameter of an EDCA queue of the terminal device is modified. A length of the TXOP limit is less than or equal to a slot length, to ensure that there is an opportunity of accessing the channel in each slot. A value of the AIFSN is greater than or equal to 2, to avoid a collision occurring between selecting of a random backoff window for the EDCA queue and PIFS preemption.

FIG. 11 is a schematic diagram of performing channel access and channel contention by a WLAN device. For a WLAN device that performs channel access by using a DCF, AIFS=DIFS=2*aSlotTime+SIFS. For a WLAN device that performs channel access by using an EDCA, AIFS=AIFSN[AC]*aSlotTime+SIFS, that is, the AIFS is related to a value of an AIFSN of each access category (AC). When AIFSN=0, AIFS=SIFS; when AIFSN=1, AIFS=PIFS; when AIFSN=2, AIFS=DIFS; and when AIFSN>2, AIFS>DIFS. The 802.11 standard specifies that a minimum value of the AIFSN is 2, that is, a minimum value of the AIFS is DIFS. However, in the Wi-Fi alliance, the value of the AIFSN of the AP is allowed to be 1. Therefore, for an AP, if an AIFSN of an access category AC is equal to 1 and a random backoff value is 0 (a probability is low, but it is still possible), the AP actually uses a channel directly after the PIFS, which causes interference to an AP that is accessing the channel in a slot of the AP. Therefore, the AP can set the value of the AIFSN of the EDCA queue to be greater than or equal to 2.

In one embodiment, the AP may add the first traffic (a downlink traffic herein) to a first queue for sending, and add another downlink traffic other than the first traffic to a second queue for sending. A manner in which the first queue accesses the channel is different from a manner in which the second queue accesses the channel. A traffic in the first queue may access the channel by using the EDCA or the PIFS, and a traffic in the second queue may access the channel by using the EDCA. If the AP detects that the channel changes from busy to idle in a slot of the AP, the AP immediately preempts the channel by using the PIFS and preferentially sends the traffic in the first queue. If the AP detects, in a slot of another AP, that the channel changes from busy to idle, and sending of both the traffic in the first queue and the traffic in the second queue are not completed, both the traffic in the first queue and the traffic in the second queue may be sent in a contention manner in the EDCA access manner.

In this embodiment of this application, the first device allocates the different slots to the plurality of APs, and the AP may obtain, in the slot corresponding to the AP, the opportunity of preferentially accessing the channel, to avoid the contention and the collision generated by the plurality of APs in the channel access process, thereby improving quality of service of the traffic.

Figures 12, 13:
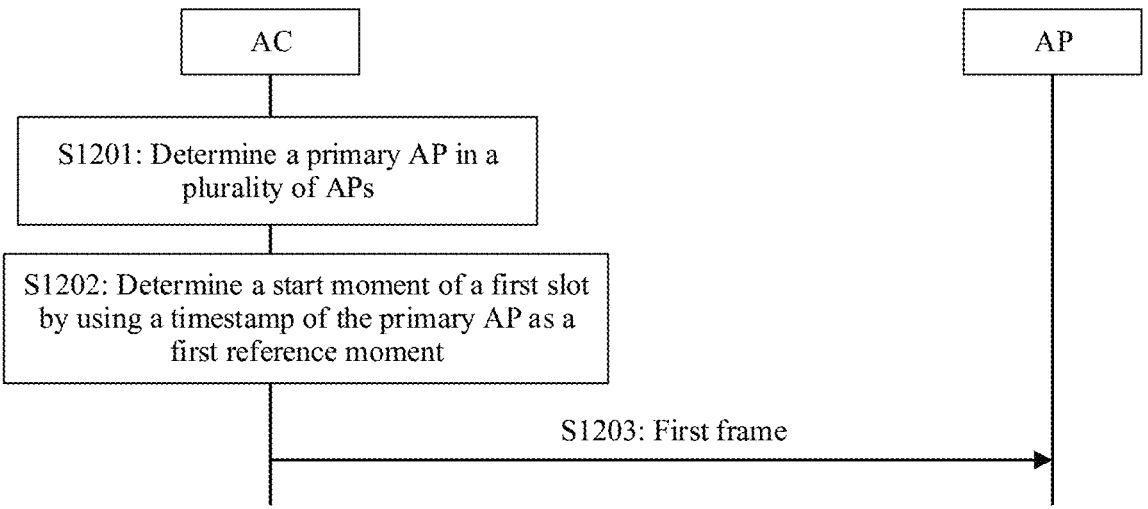
FIG. 12 is a schematic flowchart of a channel access method according to an embodiment of this application.
FIG. 13 is a schematic diagram of slot allocation of each AP in one slot interval.

FIG. 12 is a schematic flowchart of a channel access method according to an embodiment of this application. This embodiment of this application includes at least the following operations.

S1201: An AC determines a primary AP in a plurality of APs.

Each AP may send, to the AC, a beacon that is sent by another AP in the plurality of APs and that is received by the AP, where the beacon includes a basic service set identifier (BSSID). After receiving the beacon, the AC may determine, based on the basic service set identifier BSSID, air interface signal reachability between the plurality of APs, and select, from the plurality of APs, an AP that can listen to beacons of all other APs and whose beacon can be listened by all the other APs as the primary AP.

In one embodiment, the first AP may determine signal strength of a received beacon sent by another AP, and send a received signal strength indicator (RSSI) to the AC, where the RSSI indicates the signal strength of the received beacon. If at least two APs in the plurality of APs meet an air interface signal reachability requirement, an AP with highest signal strength of a received beacon may be selected from the at least two APs as the primary AP.

S1202: The AC determines a start moment of a first slot of the first AP in the plurality of APs by using a timestamp of the primary AP as a first reference moment.

The AC may configure a slot interval and duration that of a slot of each AP. The AC may further configure a start moment of the beacon, a beacon interval, duration $\Delta t$ of a boundary guard interval, and a length of a second slot. The duration $\Delta t$ of the boundary guard interval is a reserved period of time, and a corresponding AP does not perform channel access by using the PIFS in duration $\Delta t$ of a boundary guard interval after the slot starts or duration $\Delta t$ of a boundary guard interval before the slot ends, thereby avoiding slot overlapping and a possible collision between APs caused by a timing offset. The second slot is a reserved time window, and the second slot is used to send a beacon, a data frame, a control frame, another management frame, or the like. The slot interval is determined based on a maximum allowable latency of the first traffic. The first traffic may be a low-latency traffic or a latency-sensitive traffic.

It should be noted that the AC may configure a slot number in one slot interval based on a quantity of the plurality of APs and air interface signal reachability between the plurality of APs. If air interface signals between the plurality of APs are reachable, the slot number in one slot interval is equal to the quantity of the plurality of APs. If signals between two APs in the plurality of APs are unreachable, the two APs may share one slot, and the slot number in one slot interval may be less than the quantity of the plurality of APs.

The determining the start moment of the first slot of the first AP includes at least the following two optional manners.

In an optional manner, a first device may determine a slot length based on a slot interval of the first slot, the length of the second slot, and the slot number in one slot interval. The slot length=(the slot interval−the length of the second slot)/ the slot number. Then, the start moment of the first slot in the slot interval is determined based on a length of the first slot and the duration of the boundary guard interval. In this process, the AC uses the timestamp of the primary AP as the first reference moment, and uses a time offset of the first slot of the first AP relative to the first reference moment as the start moment of the first slot.

For example, the AC first selects the following parameters: the beacon interval is 100 ms, duration required for the AP to send the beacon is 2 ms (the length of the second slot), the slot interval is 10 ms, and the duration $\Delta t$ of the boundary guard interval, for example, is 10 μs. In addition, the AC determines, based on the air interface signal reachability between the plurality of APs, that the slot number in one slot interval is 5.

The AC calculates the slot length $t_1$=(the slot interval−the length of the second slot)/the slot number=(10−2)/5=1.6 ms. If the duration of the boundary guard interval is configured for each slot, the slot length may be equal to a sum of an effective length (from the start moment to an end moment) of the slot and the duration of the boundary guard interval. Then, the AC uses the timestamp of the primary AP as the reference moment. A remainder is obtained after a modulo operation is performed on the slot interval to calculate a time offset of a slot of each AP as a start moment of the slot of the AP.

As shown in Table 1, a start moment of a slot of an AP 1 is 0+$\Delta t$, a start moment of a slot of an AP 2 is 1.6+$\Delta t$, a start moment of a slot of an AP 3 is 3.2+$\Delta t$, a start moment of a slot of an AP 4 is 4.8+$\Delta t$, a start moment of a slot of an AP 5 is 6.4+$\Delta t$, and a start moment of a beacon is 8.

TABLE 1

| AP 1 | AP 2 | AP 3 | AP 4 | AP 5 | Beacon |
|------|------|------|------|------|--------|
| 0 + $\Delta t$ | 1.6 + $\Delta t$ | 3.2 + $\Delta t$ | 4.8 + $\Delta t$ | 6.4 + $\Delta t$ | 8 |

FIG. 13 is a schematic diagram of slot allocation of each AP in one slot interval. The slot interval is 10 ms, and a slot number is 5. The start moment of the slot of the AP 1 is 0+$\Delta t$, an end moment is 1.6−$\Delta t$, and a slot length is 1.6 ms. The start moment of the slot of the AP 2 is 1.6+$\Delta t$, an end moment is 3.2−$\Delta t$, and a slot length is 1.6 ms. The start moment of the slot of the AP 3 is 3.2+$\Delta t$, an end moment is 4.8−$\Delta t$, and a slot length is 1.6 ms. The start moment of the slot of the AP 4 is 4.8+$\Delta t$, an end moment is 6.4−$\Delta t$, and a slot length is 1.6 ms. The start moment of the slot of the AP 5 is 6.4+$\Delta t$, an end moment is 8−$\Delta t$, and a slot length is 1.6 ms. The last slot is a slot used to send the beacon, the start moment is 8+$\Delta t$, an end moment is 10−$\Delta t$, and a slot length is 2 ms.

FIG. 14 is another schematic diagram of slot allocation of each AP in one slot interval. The slot interval remains unchanged at 10 ms. Because the duration used to send the beacon becomes longer, duration of a slot that can be used by each AP is reduced from 1.6 to 1.2. The start moment of the slot of the AP 1 is 0+Δt, the end moment is 1.2−Δt, and the slot length is 1.2 ms. The start moment of the slot of the AP 2 is 1.2+Δt, the end moment is 2.4−Δt, and the slot length is 1.2 ms. The start moment of the slot of the AP 3 is 2.4+Δt, the end moment is 3.6−Δt, and the slot length is 1.2 ms. The start moment of the slot of the AP 4 is 3.6+Δt, the end moment is 4.8−Δt, and the slot length is 1.2 ms. The start moment of the slot of the AP 5 is 4.8+Δt, the end moment is 6−Δt, and the slot length is 1.6 ms. The last slot is a slot used to send the beacon, the start moment is 6+Δt, the end moment is 10−Δt, and the slot length is 4 ms.

second slot (time windows for sending the beacons of the AP 1 to the AP 5) is reserved to determine a time offset of each slot of each AP as a start moment of the slot of the AP. As shown in Table 2, the beacon interval is 100 ms, including nine slot intervals. In the first slot interval, a start moment of a slot of the AP 1 is 1+Δt, a start moment of a slot of the AP 2 is 3+Δt, a start moment of a slot of the AP 3 is 5+Δt, a start moment of a slot of the AP 4 is 9+Δt, and a start moment of a slot of the AP 5 is 11+Δt. A start moment of the reserved second slot is 7+Δt, and is used to send a beacon of the AP 1. A case in another slot interval is similar to this.

TABLE 2

| AP1 | 1 + Δt | 13 + Δt | 25 + Δt | 35 + Δt | 47 + Δt | 57 + Δt | 69 + Δt | 79 + Δt | 91 + Δt |
|-----|--------|---------|---------|---------|---------|---------|---------|---------|---------|
| AP2 | 3 + Δt | 15 + Δt | 27 + Δt | 37 + Δt | 49 + Δt | 59 + Δt | 71 + Δt | 81 + Δt | 93 + Δt |
| AP3 | 5 + Δt | 17 + Δt | 29 + Δt | 39 + Δt | 51 + Δt | 61 + Δt | 73 + Δt | 85 + Δt | 95 + Δt |
| AP4 | 9 + Δt | 19 + Δt | 31 + Δt | 41 + Δt | 53 + Δt | 63 + Δt | 75 + Δt | 85 + Δt | 97 + Δt |
| AP5 | 11 + Δt | 21 + Δt | 33 + Δt | 45 + Δt | 55 + Δt | 65 + Δt | 77 + Δt | 87 + Δt | 99 + Δt |

Figure 15A:
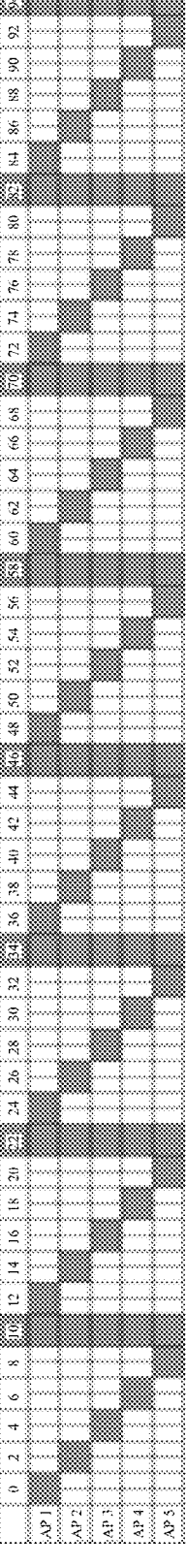
FIG. 15(A) and FIG. 15(B) each are another schematic diagram of slot allocation of each AP in one slot interval.
Figure 15B:
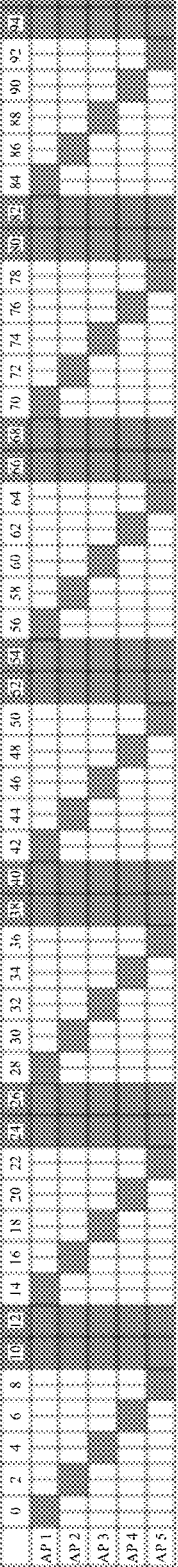

FIG. 15(A) and FIG. 15(B) each are another schematic diagram of slot allocation of each AP in one slot interval according to an embodiment of this application. A slot length of each AP remains unchanged, and is fixed at 2 ms. Because the duration for sending the beacon is changed from original 2 ms to 4 ms, a slot of 2 ms is added to send the beacon, and the slot interval is changed from 12 ms in FIG. 15(A) to 14 ms in FIG. 15(B).

It should be noted that the slot configuration solution may not be limited to the foregoing several solutions, and another configuration solution may be used. For example, the second slot is not limited to the last slot in one slot interval, and may be another position in one slot interval. The another configuration solution is similar to this. Details are not described herein again.

In another optional manner, the AC may determine a time window of the second slot in one beacon interval based on a start moment of the second slot and duration of the second slot, and then determine the start moment of the first slot of the first AP based on the slot interval, the slot number, the slot length, and the duration of the boundary guard interval in addition to the time window of the second slot in the beacon interval. In this process, the AC uses the timestamp of the primary AP as the first reference moment, and uses a time offset of the first slot of the first AP relative to the first reference moment as the start moment of the first slot.

For example, the AC selects the following parameters: the beacon interval is 100 ms, the length of the first slot is 2 ms, duration required for the AP to send the beacon is 2 ms (the length of the second slot), and the duration Δt of the boundary guard interval (for example, 10 μs). Each AP calculates relative time (a modulo Beacon interval) of target beacon transmission time (TBTT) of the AP relative to a TSF of the primary AP, and reports the relative time to the AC. The relative time includes: the AP 1: 7 ms, the AP 2: 23 ms, the AP 3: 43 ms, the AP 4: 67 ms, and the AP 5: 89 ms. The AC determines, based on air interface signal reachability between APs, that a slot number in each slot interval is 5.

Then, the AC determines the slot interval based on duration required for sending the beacon by the AP, the length of the first slot, and the slot number in one slot interval. The slot interval=the length of the first slot*the slot number in one slot interval+the duration required for sending the beacon by the AP*a quantity of TBTTs in one slot.

Figure 16:
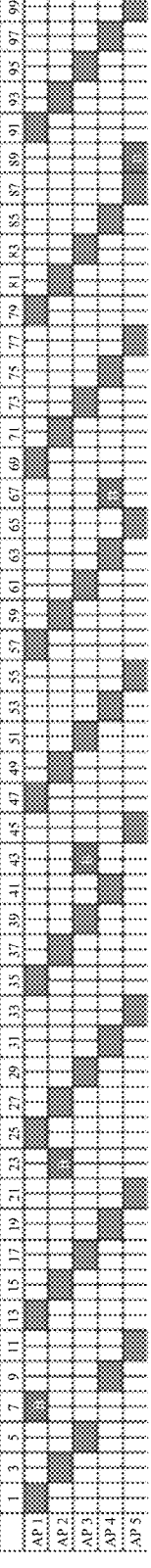
FIG. 16 is a schematic diagram of slot allocation of each AP in one beacon interval.

The AC uses the TSF of the primary AP as the reference moment. A remainder is obtained after a modulo operation is performed on the beacon interval of 100 ms and the FIG. 16 is a schematic diagram of slot allocation of each AP in a beacon interval according to an embodiment of this application. The beacon interval is 100 ms. When one slot interval includes at most one TBTT, a maximum slot interval is 12 ms. For example, the first slot interval in FIG. 16 includes five slots (10 ms in total) of the AP 1 to the AP 5 and one reserved time window (a start moment is 7+Δt, a slot length is 2 ms, and through which a beacon of the AP 1 is sent), and a minimum slot interval is 10 ms. The third slot interval in FIG. 16 includes only five slots (10 ms in total) of the AP 1 to the AP 5. In another slot interval, 23+Δt is a start moment of a reserved time window for sending a beacon of the AP 2, 43+Δt is a start moment of a reserved time window for sending a beacon of the AP 3, 67+Δt is a start moment of a reserved time window for sending a beacon of the AP 4, and 89+Δt is a start moment of a reserved time window for sending a beacon of the AP 5. At is not marked.

Figure 17:
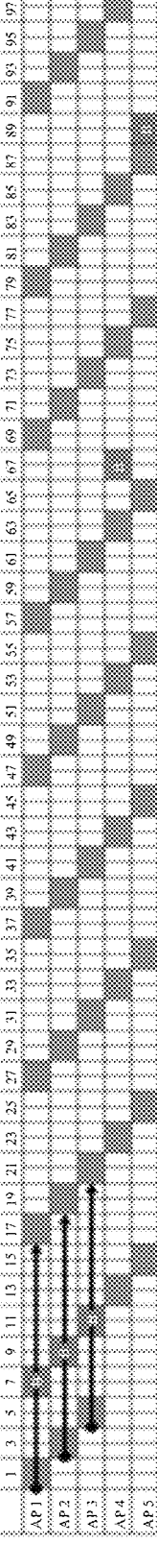
FIG. 17 is another schematic diagram of slot allocation of each AP in one beacon interval.

FIG. 17 is another schematic diagram of slot allocation of each AP in a beacon interval according to an embodiment of this application. When one slot interval includes a plurality of TBTTs, a maximum slot interval is 16 ms. For example, the first slot interval in FIG. 17 includes five slots (10 ms in total) of the AP 1 to the AP 5 and three reserved time windows (a start moment is 7+Δt, a slot length is 2 ms, and through which a beacon of the AP 1 is sent; a start moment is 9+Δt, a slot length is 2 ms, and through which a beacon of the AP 2 is sent; a start moment is 11+Δt, a slot length is 2 ms, and through which a beacon of the AP 3 is sent), and a minimum slot interval is 10 ms. The second slot interval in FIG. 17 includes only five slots (10 ms in total) of the AP 1 to the AP 5. In another slot interval, 67+Δt is a start moment of a reserved time window for sending a beacon of the AP 4, and 89+Δt is a start moment of a reserved time window for sending a beacon of the AP 5. At is not marked.

It should be noted that the slot configuration method may not be limited to the foregoing several methods, and another configuration method may be used, which is similar to the foregoing configuration method. Details are not described herein again.

S1203: The AC sends a first frame to the first AP.

The first frame includes first indication information. The first indication information may include a slot interval of the first slot, duration of the first slot, and a start moment of the first slot. In one embodiment, the first indication information may further include the first reference moment. After receiving the first frame, the first AP may determine an absolute start moment based on the first reference moment and the start moment of the first slot. When the absolute start moment arrives, contention access starts to be performed in the first slot allocated by the AC to the first AP. Then, after the duration of the first slot expires, the first AP is prohibited from performing contention access in the first slot. Finally, after the slot interval of the first slot expires, the first AP may start to perform contention access in the first slot again.

In one embodiment, the first indication information further includes one or more of the following: a start moment of a beacon, a beacon interval, duration of a boundary guard interval, and a second slot, and the second slot is a reserved time window. The second slot is used to send a beacon, a data frame, a control frame, another management frame, or the like.

For an implementation of this operation, refer to the implementation in which the timestamp of the primary AP is used as the first reference moment in S602. Details are not described in this operation again.

In this embodiment of this application, the AC allocates the different slots to the plurality of APs by using the timestamp of the primary AP as the reference moment, and each AP may obtain, in the slot corresponding to the AP, the opportunity of preferentially accessing the channel, to avoid the contention and the collision with the another AP in the channel access process, thereby improving quality of service of the traffic.

FIG. 18 is a schematic flowchart of a channel access method according to an embodiment of this application. This embodiment of this application includes at least the following operations.

S1801: An AC determines a start moment of a first slot of a first AP in a plurality of APs by using a local clock of the AC as a second reference moment.

The determining the start moment of the first slot of the first AP includes at least the following two optional manners.

In an optional manner, a first device may determine a slot length based on a slot interval of the first slot, a length of a second slot, and a slot number in one slot interval. The slot length=(the slot interval−the length of the second slot)/the slot number. Then, the start moment of the first slot in one slot interval is determined based on the slot length. In this process, the AC may use the local clock as the second reference moment, and use a time offset of the first slot of the first AP relative to the second reference moment as a start moment of the first slot.

It should be noted that, because a slot boundary is controlled by the AC, duration $\Delta t$ of a boundary guard interval may not be required.

For example, the AC first selects the following parameters: a beacon interval is 100 ms, duration required for the AP to send a beacon is 2 ms (the length of the second slot), and the slot interval is 10 ms. The AC determines, based on air interface signal reachability between the plurality of APs, that the slot number in one slot interval is 5.

The AC calculates the slot length $t_1$=(the slot interval−the length of the second slot)/the slot number=(10−2)/5=1.6 ms. The AC uses the local clock as the reference moment. A remainder is obtained after a modulo operation is performed on the slot interval to calculate a time offset of a slot of each AP as a start moment of the slot of the AP.

As shown in Table 3, the slot interval is 10 ms. A start moment of a slot of an AP 1 is 0, a start moment of a slot of an AP 2 is 1.6, a start moment of a slot of an AP 3 is 3.2, a start moment of a slot of an AP 4 is 4.8, a start moment of a slot of an AP 5 is 6.4, and a start moment of a beacon is 8.

TABLE 3

| AP 1 | AP 2 | AP 3 | AP 4 | AP 5 | Beacon |
|------|------|------|------|------|--------|
| 0 | 1.6 | 3.2 | 4.8 | 6.4 | 8 |

FIG. 19 is a schematic diagram of slot allocation of each AP in a slot interval according to an embodiment of this application. The slot interval is 10 ms, and a slot number is 5. The start moment of the slot of the AP 1 is 0, an end moment is 1.6, and a slot length is 1.6 ms. The start moment of the slot of the AP 2 is 1.6, an end moment is 3.2, and a slot length is 1.6 ms. The start moment of the slot of the AP 3 is 3.2, an end moment is 4.8, and a slot length is 1.6 ms. The start moment of the slot of the AP 4 is 4.8, an end moment is 6.4, and a slot length is 1.6 ms. The start moment of the slot of the AP 5 is 6.4, an end moment is 8, and a slot length is 1.6 ms. The last slot is a slot used to send the beacon, the start moment is 8, an end moment is 10, and a slot length is 2 ms.

In another optional manner, the AC may determine a time window of the second slot in one beacon interval based on a start moment of the second slot and duration of the second slot, and then determine the start moment of the first slot of the first AP based on the slot interval, the slot number, and the slot length in addition to the time window of the second slot in the beacon interval. In this process, the AC uses the local clock as the second reference moment, and uses a time offset of the first slot of the first AP relative to the second reference moment as a start moment of the first slot.

For example, the AC selects the following parameters: the beacon interval is 100 ms, the length of the first slot is 2 ms, and duration required for the AP to send the beacon is 2 ms (the length of the second slot). Each AP calculates relative time (a modulo Beacon interval) of a TBTT of the AP relative to a TSF of a primary AP, and reports the relative time to the AC. The relative time includes: the AP 1: 7 ms, the AP 2: 23 ms, the AP 3: 43 ms, the AP 4: 67 ms, and the AP 5: 89 ms. The AC determines, based on air interface signal reachability between APs, that a slot number in each slot interval is 5.

Then, the AC determines the slot interval based on the duration required for sending the beacon by the AP, the length of the first slot, and the slot number in one slot interval. The slot interval=the length of the first slot*the slot number in one slot interval+the duration required for sending the beacon by the AP*a quantity of TBTTs in one slot.

The AC uses the local clock as the reference moment. A remainder is obtained after a modulo operation is performed on the beacon interval of 100 ms and the second slot (time windows for sending the beacons of the AP 1 to the AP 5) is reserved to determine a time offset of each slot of each AP as a start moment of the slot of the AP. As shown in Table 4, the beacon interval is 100 ms, including nine slot intervals. In the first slot interval, a start moment of a slot of the AP 1 is 1, a start moment of a slot of the AP 2 is 3, a start moment of a slot of the AP 3 is 5, a start moment of a slot of the AP 4 is 9, and a start moment of a slot of the AP 5 is 11. A start moment of the reserved second slot is 7, and is used to send a beacon of the AP 1. A case in another slot interval is similar to this.

TABLE 4

| AP 1 | 1 | 13 | 25 | 35 | 47 | 57 | 69 | 79 | 91 |
|------|---|----|----|----|----|----|----|----|----|
| AP 2 | 3 | 15 | 27 | 37 | 49 | 59 | 71 | 81 | 93 |
| AP 3 | 5 | 17 | 29 | 39 | 51 | 61 | 73 | 85 | 95 |

TABLE 4-continued

| AP 4 | 9 | 19 | 31 | 41 | 53 | 63 | 75 | 85 | 97 |
| AP 5 | 11 | 21 | 33 | 45 | 55 | 65 | 77 | 87 | 99 |

Figure 20:
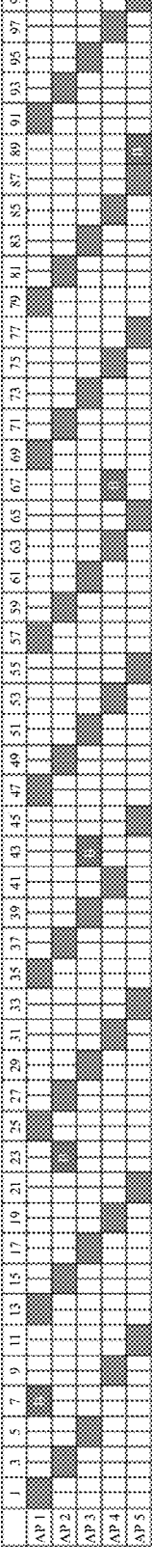
FIG. 20 is a schematic diagram of slot allocation of each AP in one beacon interval.

FIG. 20 is a schematic diagram of slot allocation of each AP in a beacon interval according to an embodiment of this application. The beacon interval is 100 ms. When one slot interval includes at most one TBTT, a maximum slot interval is 12 ms. For example, the first slot interval in FIG. 20 includes five slots (10 ms in total) of the AP 1 to the AP 5 and one reserved time window (a start moment is 7, a slot length is 2 ms, through which a beacon of the AP 1 is sent, and the reserved time window is marked by B in the figure), and a minimum slot interval is 10 ms. The third slot interval in FIG. 20 includes only five slots (10 ms in total) of the AP 1 to the AP 5. In another slot interval, 23 is a start moment of a reserved time window for sending a beacon of the AP 2, 43 is a start moment of a reserved time window for sending a beacon of the AP 3, 67 is a start moment of a reserved time window for sending a beacon of the AP 4, and 89 is a start moment of a reserved time window for sending a beacon of the AP 5.

Certainly, in this embodiment of this application, the duration Δt, of the boundary guard interval may also be used to allocate the slot of each AP=.

It should be noted that, the slot configuration solution may not be limited to the foregoing several solutions, and reference may be made to the slot configuration solution in the embodiment shown in FIG. 12. A configuration method is similar. Details are not described herein again.

S1802: The AC sends a first frame to the first AP.

When the AC determines that the start moment of the first slot of the first AP arrives, the AC sends the first frame to the first AP. The first frame indicates the first AP to perform contention access for the first traffic in the first slot.

In one embodiment, when the AC determines that an end moment of the first slot of the first AP arrives, the AC sends a second frame to the first AP, where the second frame indicates that the first AP is prohibited from performing contention access by using the PIFS.

In one embodiment, the AC may send, to the first AP, at least one of the following: the beacon interval, the length of the first slot, the slot interval of the first slot, the slot number in one slot interval, the TBTT, and the length of the second slot.

For an implementation of this operation, refer to the implementation of using the local clock of the AC as the second reference moment in S602. Details are not described in this operation again.

In this embodiment of this application, the AC allocates the different slots to the plurality of APs by using the local clock as the reference moment, and each AP may obtain, in the slot corresponding to the AP, the opportunity of preferentially accessing the channel, to avoid the contention and the collision with another AP in the channel access process, thereby improving quality of service of the traffic.

In another embodiment of this application, the AC may specify or configure one AP in the plurality of APs on the WLAN as the primary AP, and another AP in the plurality of APs reports information to the primary AP, for example, a beacon, signal strength of a received beacon, and a TBTT. Based on the received information, the primary AP allocates a slot to each AP by using a timestamp of the primary AP as the reference moment. In addition, the primary AP sends the first frame to the another AP, to indicate the another AP to perform contention access for the first traffic in a respective slot. A slot allocation method of the primary AP is the same as the foregoing method for allocating the slot by the AC to each AP. For an implementation, refer to the operations in embodiments shown in FIG. 12 and FIG. 18. Details are not described herein again.

After the AP accesses the channel, if the AP has no downlink first traffic or has completed sending of the downlink first traffic, the AP may perform the following operations by using the following embodiments.

Figure 21:
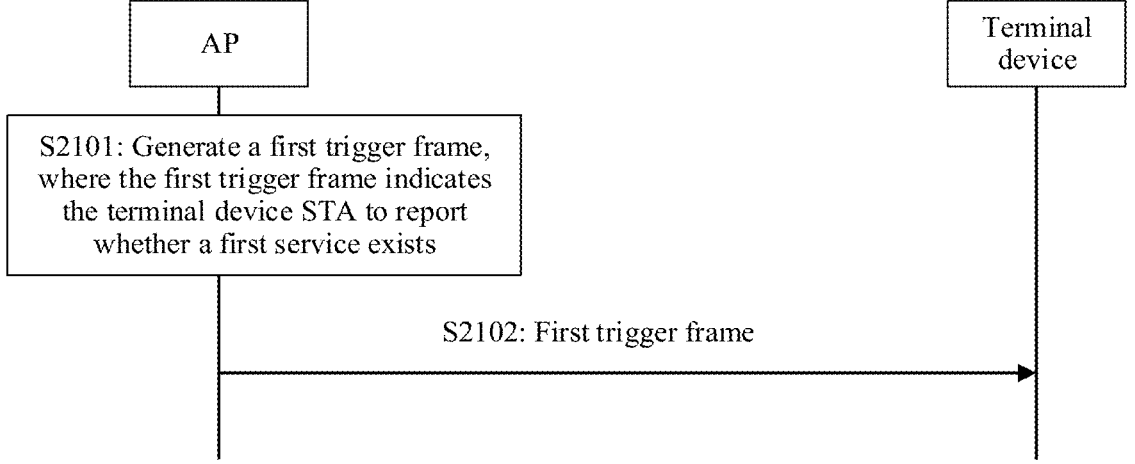
FIG. 21 is a schematic flowchart of a channel access method according to an embodiment of this application.

FIG. 21 is a schematic flowchart of a channel access method according to an embodiment of this application. This embodiment of this application includes at least the following operations.

S2101: An access point AP generates a first trigger frame, where the first trigger frame includes a first field, the first field indicates a terminal device STA to report whether a first traffic exists, and the first traffic is a latency-sensitive traffic.

In one embodiment, the first traffic may be a traffic having a high latency requirement, or may be referred to as a low-latency traffic. For example, an average latency, a worst latency, and a small jitter are as low as a few milliseconds to tens of milliseconds, and may also have reliability constraints (e.g., very low average latency and worst case latency of the order of a few to tens of milliseconds, and small jitter, all of which can have certain reliability constraints as well. Such traffic is referred to as latency sensitive traffic in this subclause).

In one embodiment, the first traffic includes a traffic for which channel access is performed by using a priority interframe space PIFS.

S2102: The AP sends the first trigger frame to the terminal device.

In one embodiment, the AP accesses a channel in a first slot by using the PIFS. After accessing the channel, the AP sends the first trigger frame to a plurality of terminal devices.

The first trigger frame may be a null data packet frame feedback report poll (non-data PPDU feedback report poll) NFRP trigger frame.

An indication manner of the first trigger frame may include the following two optional manners.

In an optional manner, the first field is a feedback type field, and the feedback type field indicates to report whether the first traffic exists.

Figure 22:
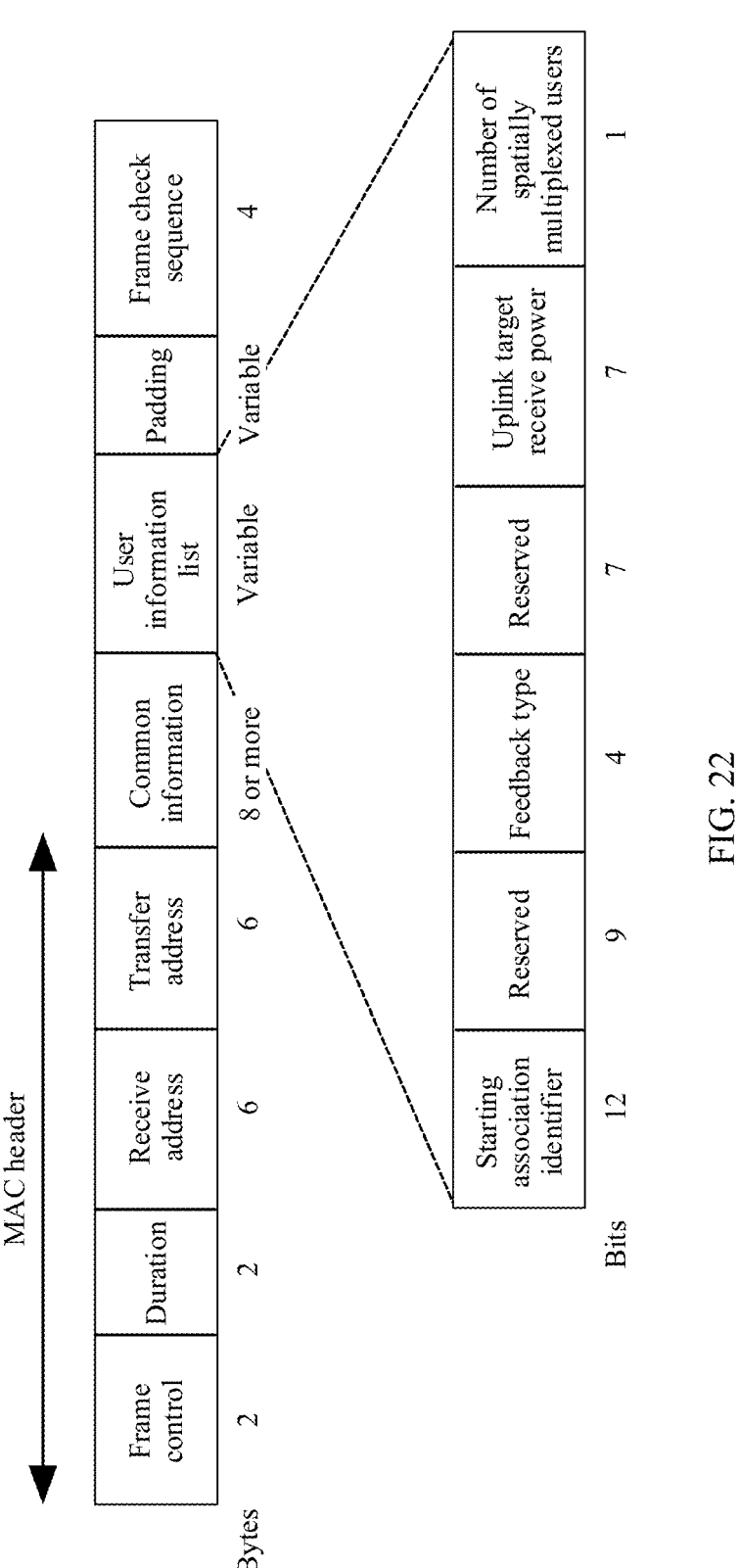
FIG. 22 is a schematic diagram of a user information field in an NFRP trigger frame.

FIG. 22 is a schematic diagram of a user information field in an NFRP trigger frame. The NFRP trigger frame includes a frame control field, a duration field, a receive address (RA) field, a transfer address (TA) field, a common information (common info) field, a user information list (user info list) field, a padding field, and a frame check sequence (FCS) field. The user information field includes a starting association identifier (starting AID) field, a first reserved field, a feedback type field, a second reserved field, an uplink target receive power (UL target receive power) field, and a number of spatially multiplexed users (number of spatially multiplexed users) field. A byte number of each field is shown in FIG. 22.

A definition of the feedback type field is shown in Table 5. The feedback type field includes four bytes (16 bits), the first bit is used to identify a resource request, and the second bit to the sixteenth bit are reserved values.

TABLE 5

| Value | Description |
| --- | --- |
| 0 | Resource request |
| 1 to 15 | Reserved |

As shown in Table 6, Table 6 is a redefined feedback type field. Any reserved value (for example, the second bit, or another reserved bit, which is not limited herein) in the feedback type field indicates a latency-sensitive resource request of the first traffic. The latency-sensitive resource request may also have another name, for example, a low-latency resource request or a dedicated scheduling request. The name is not limited herein. The other fields remain unchanged.

TABLE 6

| Value | Description |
| --- | --- |
| 0 | Resource request |
| 1 | Latency-sensitive resource request |
| 2 to 15 | Reserved |

For a terminal device that receives an NFRP trigger whose latency-sensitive resource request in the feedback type field is 1, if a first traffic needs to be scheduled, a null metadata packet feedback (null data packet feedback, NDP Feedback) frame is returned on a subcarrier group. If the first traffic does not need to be scheduled, but another traffic other than the first traffic needs to be scheduled, the NDP feedback frame is returned on another group of subcarriers. FIG. 23 is a schematic diagram of a frame format of an NDP feedback frame. The NDP feedback frame includes a legacy short training (L-STF) field, a legacy long training (L-LTF) field, a legacy signal (L-SIG) field, a repeated legacy signal (RL-SIG) field, a high-efficiency signal field A (HE-SIG-A) field, a high-efficiency short training (HE-STF) field, a high-efficiency long training (HE-LTF) field, and a packet extension (PE) field. The NDP feedback frame does not include any media access control (MAC) layer information, and 1-bit information is represented by sending energy on a subcarrier by using the HE-LTF field. If no traffic needs to be scheduled, no reply is sent. It should be noted that, that no traffic needs to be scheduled may indicate that there is no traffic, or may indicate that a traffic volume does not exceed a preset threshold.

In another optional manner, the first trigger frame includes a common information field, the common information field includes the first field, and the first field indicates to report whether the first traffic exists. The first field may be a high efficiency/extremely high throughput primary 160 (high efficiency/extremely high throughput P160, HE/EHT P160) field or a reserved field. Further, the first field is one or more bits in B54 to B63 in the common information field, and the first field indicates to report whether the first traffic exists. Alternatively, the first field may be one or more bits in any reserved field in the first trigger frame. This is not limited herein.

Figure 24:
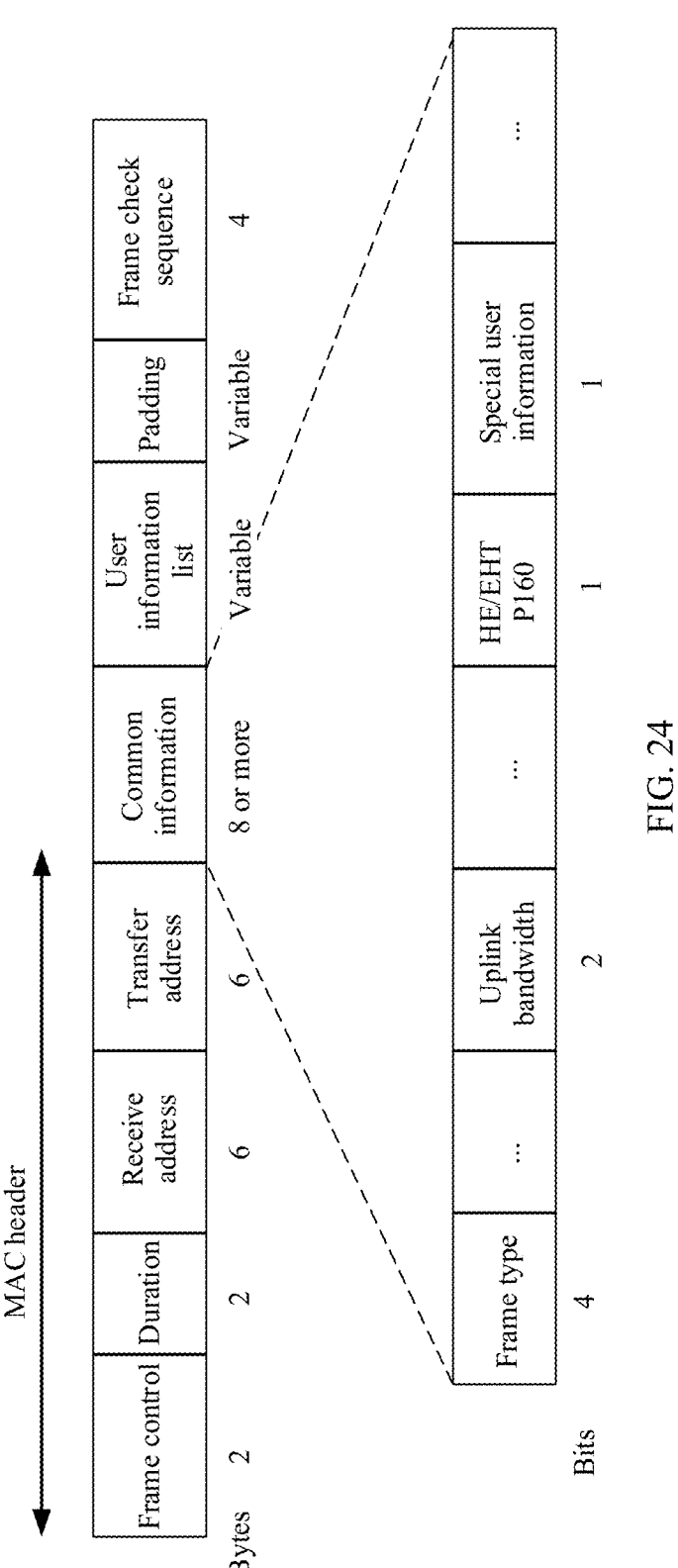
FIG. 24 is a schematic diagram of a common information field in an NFRP trigger frame.

FIG. 24 is a schematic diagram of a common information field in an NFRP trigger frame. The common information field in the NFRP trigger frame includes a frame type (Trigger type) field, an HE/EHT P160 field, a reserved field, an uplink bandwidth (UL BW) field, and another field (omitted). The HE/EHT P160 field is located in B54.

The AP may redefine the first field. When a value of the first field is 1, it indicates that the terminal device replies with a trigger-based (TB) physical layer protocol data unit (PPDU) in an HE format. When a value of the first field is 0, it indicates that the terminal device replies with a TB PPDU in the EHT format. On this basis, the following rule may be added: When the trigger type field is 7, it indicates an NFRP trigger, and if the value of the first field is 1, it indicates a legacy NFRP trigger. If the value of the first field is 0, it indicates the dedicated scheduling request of the first traffic. For a terminal device that receives an NFRP trigger whose value of the first field is 0, if a first traffic needs to be scheduled, the terminal device replies with an NDP feedback on a subcarrier group. If the first traffic does not need to be scheduled, but another traffic other than the first traffic needs to be scheduled, the NDP feedback is returned on another group of subcarriers. If no traffic needs to be scheduled, no reply is sent. It should be noted that, that no traffic needs to be scheduled may indicate that there is no traffic, or may indicate that a traffic volume does not exceed a preset threshold.

In one embodiment, if the AP determines that all terminal devices do not have the first traffic, the AP may send a contention-free end (CF-End) frame to another device (another AP or the terminal device), to notify the another device that the TXOP obtained through preemption by using the PIFS has stopped to be used. The channel is assigned to the another device or another traffic of the AP accesses the channel in the EDCA or DCF manner.

In one embodiment, the AP sends a second trigger frame to the terminal device, where the second trigger frame indicates to report a buffer size of the first traffic. In one embodiment, the second trigger frame includes a common information field, the common information field includes a second field, and the second field indicates to report a buffer size of the first traffic. The second field may be an HE/EHT P160 field or a reserved field. Further, the second field is one or more bits in B54 to B63 in the common information field, and the second field indicates to report a buffer size of the first traffic. Alternatively, the second field may be one or more bits in any reserved field in the first trigger frame. This is not limited herein.

In one embodiment, the second trigger frame includes a user information field, the user information field includes a trigger dependent user information (trigger dependent user info) field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

It should be noted that all traffics of the $i^{th}$ traffic type may be first traffics, and the terminal device reports buffer sizes of all the traffics of the $i^{th}$ traffic type. Alternatively, traffics of the $i^{th}$ traffic type may include a first traffic and a non-first traffic, and the terminal device may report a buffer size of the first traffic in the traffics of the $i^{th}$ traffic type or report buffer sizes of all traffics of the $i^{th}$ traffic type. Different traffic types correspond to different traffic identifiers (TID).

For example, the second trigger frame may be a buffer status report poll (BSRP) trigger frame. The BSRP trigger includes a common information (common info) field, a user information (user info) field, a special user information (special user info) field, and the like.

When a value of the second field (for example, the HE/EHT P160 field or the reserved field) in the common information field in the BSRP trigger is 0, it indicates that the current BSRP trigger is a dedicated buffer status report (BSR) of the first traffic. Further, when the value of the second field of the common information field in the BSRP trigger frame is 0, the AP may redefine a trigger dependent user information field in the user information field or a special user information field in the BSRP trigger frame, where the trigger dependent user information field is used to carry a TID bitmap of a traffic type corresponding to the first traffic.

FIG. 25 is a schematic diagram of a user information field in a BSRP trigger. The user information field includes an association identifier (AID) 12 field, a resource unit allocation (RU Allocation) field, an uplink FEC coding type (UL FEC coding type) field, an uplink extremely high throughput modulation and coding scheme (UL EHT MCS) field, a spatial stream allocation/random access resource unit information (SS Allocation/RA-RU information) field, an uplink target receive power (UL target receive power) field, a primary/secondary 160 (PS160) field, and a trigger dependent user information field. The trigger dependent user information field is related to a type of the trigger frame. A byte number of each field is shown in FIG. 25.

FIG. 26 is a schematic diagram of a special user information field in a BSRP trigger. The special user information field includes an association identifier (AID) 12 field, a physical version identifier (PHY version ID) field, an uplink bandwidth extension (UL bandwidth extension) field, a spatial reuse 1 field, a spatial reuse 2 field, a universal signal (U-SIG) field, a reserved field, and a trigger dependent user information field. The trigger dependent user information field is related to a type of the trigger frame. A byte number of each field is shown in FIG. 26.

The trigger dependent user information field in the user information field or the special user information field includes a TID bitmap. The TID bitmap may include eight bits, and one bit corresponds to one TID. For example, the first bit corresponds to a TID1, the second bit corresponds to a TID2, the third bit corresponds to a TID3, . . . , and the like. When the AP polls a buffer size of a first traffic corresponding to a TID, a corresponding bit in the TID bitmap is set to 1, and other bits are set to 0. For example, when the TID bitmap is 10000000, it indicates the terminal device to report a buffer size of a first traffic corresponding to the TID1. In one embodiment, 0 and 1 may alternatively indicate opposite cases. When the AP polls a buffer size of a first traffic corresponding to a TID, a corresponding bit in the TID bitmap is set to 0, and other bits are set to 1. For example, when the TID bitmap is 10111111, it indicates the terminal device to report a buffer size of a first traffic corresponding to the TID2.

Finally, a terminal device that receives the BSRP trigger preferentially reports a buffer size that is of a first traffic corresponding to the TID and that is indicated by using the TID bitmap. In one embodiment, the terminal device may report to the AP by using a quality of service control (QoS control) field and/or a buffer status report control (BSR control) field in a quality of service (QoS Null) frame, the buffer size of the first traffic corresponding to the TID.

In one embodiment, the STA receives a third trigger frame from the AP, where the third trigger frame indicates to trigger the terminal device to send the first traffic.

In one embodiment, the third trigger frame includes a common information field, the common information field includes a third field, and the third field indicates that the third trigger frame is a trigger frame that triggers sending of the first traffic. The third field may be an HE/EHT P160 field or a reserved field. Further, the third field is one or more bits in B54 to B63 in the common information field, and the third field indicates that the third trigger frame is a trigger frame that triggers sending of the first traffic.

In one embodiment, the third trigger frame includes a user information field, the user information field includes a trigger dependent user information field, the trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M. Different traffic types correspond to different TIDs.

It should be noted that all traffics of the $j^{th}$ traffic type may be first traffics, and the terminal device reports all the traffics of the $j^{th}$ traffic type. Alternatively, traffics of the $j^{th}$ traffic type may include a first traffic and a non-first traffic, and the terminal device may report the first traffic in the traffics of the $j^{th}$ traffic type or report all traffics of the $j^{th}$ traffic type.

It should be noted that the quantity N of bits of the trigger dependent user information field in the second trigger frame may be equal to the quantity M of bits of the trigger dependent user information field in the third trigger frame, and the $j^{th}$ bit in the M bits corresponds to the $i^{th}$ bit in the N bits.

For example, the third trigger frame may be a basic trigger frame. The basic trigger frame includes a common information field, a user information field, a special user information field, and the like.

When a value of the third field (for example, the HE/EHT P160 field or the reserved field) in the common information field in the basic trigger frame is 0, it indicates that the current basic trigger is a dedicated trigger frame of the first traffic. Further, when the value of the third field of the common information field in the basic trigger frame is 0, the AP may redefine a trigger dependent user information field in the user information field or a special user information field in the basic trigger frame, where the trigger dependent user information field is used to carry a TID bitmap of a traffic type corresponding to the first traffic.

The trigger dependent user information field includes a TID bitmap. The TID bitmap may include eight bits, and one bit corresponds to one TID. For example, the first bit corresponds to a TID1, the second bit corresponds to a TID2, the third bit corresponds to a TID3, . . . , and the like. When the AP triggers the terminal device to send a first traffic corresponding to a TID, a corresponding bit in the TID bitmap is set to 1, and other bits are set to 0. For example, when the TID bitmap is 10000000, the terminal device is triggered to report the first traffic corresponding to the TID1. In one embodiment, 0 and 1 may alternatively indicate opposite cases. When the AP triggers the terminal device to send a first traffic corresponding to a TID, a corresponding bit in the TID bitmap is set to 0, and other bits are set to 1. For example, when the TID bitmap is 10111111, the terminal device is triggered to report the first traffic corresponding to the TID2. A terminal device that receives the basic trigger frame preferentially reports a first traffic corresponding to a TID indicated by using the TID bitmap.

In this embodiment of this application, if the AP has no downlink first traffic or has completed sending of the downlink first traffic, the AP polls, by using the trigger frame, whether the terminal device has an uplink first traffic, and triggers the terminal device to report the first traffic. The terminal device is accurately triggered to send the first traffic, to avoid hybrid transmission between the first traffic and another traffic, and improve traffic transmission efficiency.

It should be noted that the foregoing embodiments may be used separately or in combination, and embodiments obtained by combining the foregoing embodiments also fall within the protection scope of this application.

It may be understood that, in the foregoing method embodiments, the method and the operation that are implemented by the first device may be implemented by a component (for example, a chip or a circuit) that may be used in the first device, and the method and the operation that are implemented by the AP may be implemented by a component (for example, a chip or a circuit) that may be used in the AP. The method and operation implemented by the terminal device may alternatively be implemented by a component (for example, a chip or a circuit) that may be used in the terminal device.

The foregoing mainly describes the solutions provided in embodiments of this application from a perspective of interaction between the devices. It may be understood that, to implement the foregoing functions, each network element such as a transmitting end device or a receiving end device includes a corresponding hardware structure and/or software module for performing each function. A person skilled in the art may be aware that, with reference to the examples described in embodiments disclosed in this specification, units and algorithm operations can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional module division may be performed on the transmitting end device or the receiving end device based on the foregoing method example. For example, each functional module may be obtained through division corresponding to each function, or two or more functions may be integrated in one processing module. The integrated module may be implemented in a form of hardware, or may be implemented in a form of a software functional module. It should be noted that, in embodiments of this application, module division is an example, and is merely a logical function division. During actual implementation, another division manner may be used. Descriptions are provided below by using an example in which each functional module is obtained through division corresponding to each function.

The foregoing describes in detail the methods provided in embodiments of this application with reference to FIG. 6, FIG. 12, FIG. 18, and FIG. 21. The following describes in detail a channel access apparatus provided in an embodiment of this application with reference to FIG. 27 to FIG. 30. It should be understood that descriptions of apparatus embodiments correspond to the descriptions of the method embodiments. Therefore, for content that is not described in detail, refer to the foregoing method embodiments. For brevity, details are not described herein again.

Figure 27:
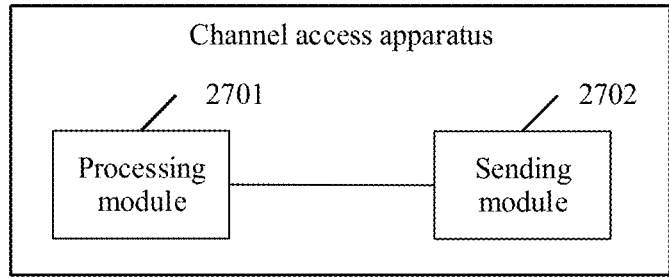
FIG. 27 is a schematic diagram of a structure of a channel access apparatus according to an embodiment of this application.

FIG. 27 is a schematic diagram of a structure of a channel access apparatus according to an embodiment of this application. The channel access apparatus may include a processing module 2701 and a sending module 2702. The sending module 2702 may communicate with the outside. The sending module 2702 may also be referred to as a communication interface, a transceiver unit, or a transceiver module. The sending module 2702 may be configured to perform an action performed by the first device in the foregoing method embodiment. The processing module 2701 is configured to perform processing, for example, determine a first frame.

For example, the sending module 2702 may also be referred to as a transceiver module or a transceiver unit (including a receiving unit and a sending unit), and the receiving unit and the sending unit are respectively configured to perform sending and receiving operations of the first device in the foregoing method embodiment.

In one embodiment, the channel access apparatus may implement the operations or the procedures performed by the first device in the foregoing method embodiment, for example, may be a first device, or a chip or a circuit configured in the first device. The sending module 2702 is configured to perform a sending/receiving-related operation of the first device side in the foregoing method embodiment. The processing module 2701 is configured to perform a processing-related operation of the first device in the foregoing method embodiment.

The processing module 2701 is configured to determine a first frame, where the first frame includes first indication information, the first indication information indicates a first AP in at least one access point AP to perform contention access for a first traffic in a first slot, and the first traffic includes a traffic for which channel access is performed by using a priority interframe space PIFS.

The sending module 2702 is configured to send the first frame to the first AP.

In one embodiment, the first indication information includes a slot interval of the first slot, duration of the first slot, and a start moment of the first slot.

In one embodiment, the first indication information further includes one or more of the following: a start moment of a beacon, a beacon interval, duration of a boundary guard interval, and a second slot, and the second slot is a reserved time window.

In one embodiment, the processing module 2701 is further configured to: select one AP from the at least one AP as a primary AP; and use a timestamp of the primary AP as a first reference moment, and use a time offset of the first slot of the first AP relative to the first reference moment as the start moment of the first slot.

In one embodiment, the first indication information further includes the first reference moment.

In one embodiment, the processing module 2701 is further configured to: use a local clock of the first device as a second reference moment, and use a time offset of the first slot of the first AP relative to the second reference moment as a start moment of the first slot.

In one embodiment, the sending module 2702 is further configured to send a second frame to the first AP, where the second frame indicates that the first AP is prohibited from performing contention access by using the PIFS.

It should be noted that, for implementation of the modules, further refer to corresponding descriptions of the method embodiments shown in FIG. 6, FIG. 12, FIG. 18, and FIG. 21, to perform method and function performed by the first device in the foregoing embodiment.

Figure 28:
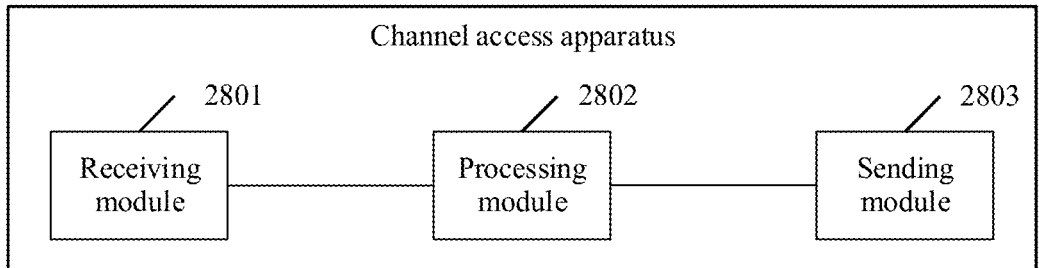
FIG. 28 is another schematic diagram of a structure of a channel access apparatus according to an embodiment of this application.

FIG. 28 is a schematic diagram of a structure of a channel access apparatus according to an embodiment of this application. The channel access apparatus may include a receiving module 2801, a processing module 2802, and a sending module 2803. The receiving module 2801 and the sending module 2803 may communicate with the outside, and the receiving module 2801 and the sending module 2803 may also be referred to as a communication interface, a transceiver unit, or a transceiver module. The receiving module 2801 and the sending module 2803 may be configured to perform an action performed by the AP in the foregoing method embodiment. The processing module 2802 is configured to perform processing, for example, perform contention access for the first traffic in the first slot.

For example, the receiving module 2801 and the sending module 2803 may also be referred to as a transceiver module or a transceiver unit (including a receiving unit and a sending unit), and the receiving unit and the sending unit are respectively configured to perform sending and receiving operations of the AP in the foregoing method embodiment.

In one embodiment, the channel access apparatus may implement the operations or the procedures performed by the AP in the foregoing method embodiment, for example, may be an AP, or a chip or a circuit configured in the AP. The receiving module 2801 and the sending module 2803 are configured to perform a sending/receiving-related operation of the AP in the foregoing method embodiment. The processing module 2802 is configured to perform a processing-related operation of the AP in the foregoing method embodiment.

In an embodiment:

The receiving module 2801 is configured to receive a first frame from a first device, where the first frame includes first indication information.

The processing module 2802 is configured to perform contention access for a first traffic in a first slot based on the first indication information, where the first traffic includes a traffic for which channel access is performed by using a priority interframe space PIFS.

In one embodiment, the first indication information includes a slot interval of the first slot, duration of the first slot, and a start moment of the first slot.

In one embodiment, the first indication information further includes one or more of the following: a start moment of a beacon, a beacon interval, duration of a boundary guard interval, and a second slot, and the second slot is a reserved time window.

In one embodiment, the start moment of the first slot is a time offset of the first slot of the first AP relative to a first reference moment, the first reference moment is a timestamp of a primary AP, and the primary AP is an AP selected from at least one AP.

In one embodiment, the first indication information further includes the first reference moment.

In one embodiment, a start moment of the first slot is a time offset of the first slot of the first AP relative to a second reference moment, and the second reference moment is a local clock of the first device.

In one embodiment, the receiving module 2801 is further configured to receive a second frame from the first device, where the second frame indicates that the first AP is prohibited from performing contention access by using the PIFS.

In another embodiment:

The processing module 2802 is configured to generate a first trigger frame, where the first trigger frame includes a first field, the first field indicates a terminal device STA to report whether a first traffic exists; and the sending module 2803 is configured to send the first trigger frame to the STA.

In one embodiment, the first traffic includes a traffic for which channel access is performed by using a priority interframe space PIFS.

In one embodiment, the first field is a feedback type field.

In one embodiment, the first trigger frame includes a common information field, the common information field includes the first field, and the first field indicates to report whether the first traffic exists.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the sending module 2803 is further configured to send a second trigger frame to the STA, where the second trigger frame indicates to report a buffer size of the first traffic.

In one embodiment, the second trigger frame includes a common information field, the common information field includes a second field, and the second field indicates to report a buffer size of the first traffic.

In one embodiment, the second trigger frame includes a user information field, the user information field includes a trigger dependent user information field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the sending module 2803 is further configured to send a third trigger frame to the STA, where the third trigger frame indicates to trigger the terminal device to send the first traffic.

In one embodiment, the third trigger frame includes a user information field, the user information field includes a trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

It should be noted that, for implementation of the modules, further refer to corresponding descriptions of the method embodiments shown in FIG. 6, FIG. 12, FIG. 18, and FIG. 21, to perform method and function performed by the AP in the foregoing embodiment.

Figure 29:
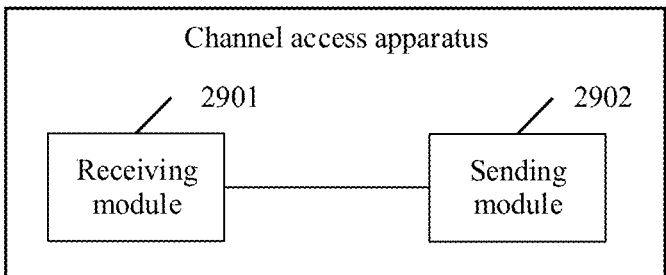
FIG. 29 is another schematic diagram of a structure of a channel access apparatus according to an embodiment of this application.

FIG. 29 is a schematic diagram of a structure of a channel access apparatus according to an embodiment of this application. The channel access apparatus may include a receiving module 2901 and a sending module 2902. The receiving module 2901 and the sending module 2902 may communicate with the outside, and the receiving module 2901 and the sending module 2902 may also be referred to as a communication interface, a transceiver unit, or a transceiver module. The receiving module 2901 and the sending module 2902 may be configured to perform an action performed by the terminal device in the foregoing method embodiment.

For example, the receiving module 2901 and the sending module 2902 may also be referred to as a transceiver module or a transceiver unit (including a receiving unit and a sending unit), and the receiving unit and the sending unit are respectively configured to perform sending and receiving operations of the terminal device in the foregoing method embodiment.

In one embodiment, the channel access apparatus may implement the operations or the procedures performed by the terminal device in the foregoing method embodiment, for example, may be a terminal device, or a chip or a circuit configured in the terminal device. The receiving module 2901 and the sending module 2902 are configured to perform a sending/receiving-related operation of the terminal device in the foregoing method embodiment.

The receiving module 2901 is configured to receive a first trigger frame from an access point AP, where the first trigger frame includes a first field. The sending module 2902 is configured to report, to the STA based on the first field, whether a first traffic exists, where the first traffic includes a traffic for which channel access is performed by using a priority interframe interval PIFS.

In one embodiment, the first traffic includes a traffic for which channel access is performed by using a priority interframe space PIFS.

In one embodiment, the first field is a feedback type field.

In one embodiment, the first trigger frame includes a common information field, the common information field includes the first field, and the first field indicates to report whether the first traffic exists.

In one embodiment, the first field is a high efficiency/extremely high throughput primary 160HE/EHT P160 field or a reserved field.

In one embodiment, the first field is B54 to B63 in the common information field, and one bit in B54 to B63 indicates to report whether the first traffic exists.

In one embodiment, the receiving module 2901 is further configured to receive a second trigger frame from the AP, where the second trigger frame indicates to report a buffer size of the first traffic.

In one embodiment, the second trigger frame includes a common information field, the common information field includes a second field, and the second field indicates to report a buffer size of the first traffic.

In one embodiment, the second trigger frame includes a user information field, the user information field includes a trigger dependent user information field, the trigger dependent user information field includes N bits, the N bits correspond to N traffic types of the first traffic, an $i^{th}$ bit in the N bits indicates whether to report a buffer size of a first traffic of an $i^{th}$ traffic type in the N traffic types. N is an integer greater than or equal to 1, and i is an integer greater than or equal to 1 and less than or equal to N.

In one embodiment, the receiving module 2901 is further configured to receive a third trigger frame from the AP, where the third trigger frame indicates to trigger the terminal device to send the first traffic.

In one embodiment, the third trigger frame includes a user information field, the user information field includes a trigger dependent user information field, the trigger dependent user information field includes M bits, the M bits correspond to M traffic types of the first traffic, a $j^{th}$ bit in the M bits indicates whether to trigger the terminal device to send a first traffic of a $j^{th}$ traffic type in the M traffic types. M is an integer greater than or equal to 1, and j is an integer greater than or equal to 1 and less than or equal to M.

It should be noted that, for implementation of the modules, further refer to corresponding descriptions of the method embodiments shown in FIG. 6, FIG. 12, FIG. 18, and FIG. 21, to perform method and function performed by the terminal device in the foregoing embodiment.

Figure 30:
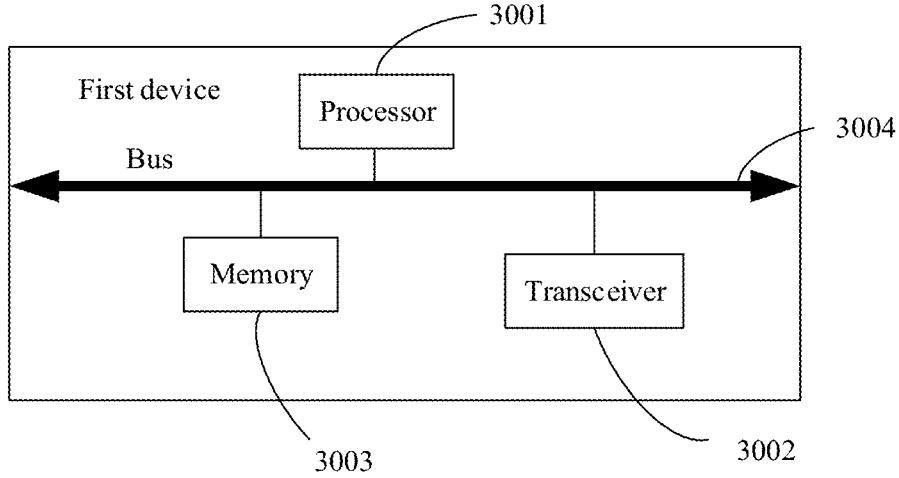
FIG. 30 is a schematic diagram of a structure of a first device according to an embodiment of this application.

FIG. 30 is a schematic diagram of a structure of a first device according to an embodiment of this application. The first device may be applied to the system shown in FIG. 1, to perform a function of the first device in the foregoing method embodiment, or implement an operation or a procedure performed by the first device in the foregoing method embodiment.

As shown in FIG. 30, the first device includes a processor 3001 and a transceiver 3002. In one embodiment, the first device further includes a memory 3003. The processor 3001, the transceiver 3002, and the memory 3003 may communicate with each other through an internal connection path, and transfer a control signal and/or a data signal. The memory 3003 is configured to store a computer program. The processor 3001 is configured to: invoke the computer program from the memory 3003 and run the computer program, to control the transceiver 3002 to receive and send a signal. In one embodiment, the first device may further include an antenna, and the antenna is configured to send, by using a radio signal, uplink data or uplink control signaling output by the transceiver 3002.

The processor 3001 may correspond to the processing module in FIG. 28, and may be combined with the memory 3003 into a processing apparatus. The processor 3001 is configured to execute program code stored in the memory 3003 to implement the foregoing function. During implementation, the memory 3003 may alternatively be integrated into the processor 3001, or may be independent of the processor 3001.

The transceiver 3002 may correspond to the sending module in FIG. 28, and may also be referred to as a transceiver unit or a transceiver module. The transceiver 3002 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the first device shown in FIG. 30 can implement the processes related to the first device in the method embodiments shown in FIG. 6, FIG. 12, FIG. 18, and FIG. 21. The operations and/or the functions of the modules in the first device are separately for implementing corresponding procedures in the foregoing method embodiments. For details, refer to the descriptions in the foregoing method embodiments. To avoid repetition, detailed descriptions are properly omitted herein.

The processor 3001 may be configured to perform an action implemented inside the first device described in the foregoing method embodiment, and the transceiver 3002 may be configured to perform an action of sending performed by the first device to the first AP or receiving performed by the first device from the first AP described in the foregoing method embodiment. For details, refer to the descriptions in the foregoing method embodiments. Details are not described herein again.

The processor 3001 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor 3001 may be a combination of processors implementing a computing function, for example, a combination of one or more microprocessors, or a combination of the digital signal processor and a microprocessor. The communication bus 3004 may be a peripheral component interconnect PCI bus, an extended industry standard architecture EISA bus, or the like. The bus may be classified into an address bus, a data bus, a control bus, and the like. For ease of illustration, only one bold line is used in FIG. 30 to represent the bus, which, however, does not mean that there is only one bus or only one type of bus. The communication bus 3004 is configured to implement connection and communication between these components. The transceiver 3002 in embodiments of this application is configured to perform signaling or data communication with another node device. The memory 3003 may include a volatile memory, such as a non-volatile dynamic random access memory (NVRAM), a phase-change random access memory (PRAM), or a magnetoresistive random access memory (magnetoresistive RAM, MRAM). The memory may further include a nonvolatile memory, such as at least one magnetic disk storage device, an electrically erasable programmable read-only memory (EEPROM), a flash storage device such as a NOR flash memory or a NAND flash memory, or a semiconductor device such as a solid-state drive (SSD). In one embodiment, the memory 3003 may alternatively be at least one storage apparatus far away from the processor 3001. In one embodiment, the memory 3003 may further store a group of computer program code or configuration information. In one embodiment, the processor 3001 may further execute a program stored in the memory 3003. The processor may cooperate with the memory and the transceiver to perform any method and function of the first device in the foregoing embodiment of this application.

Figure 31:
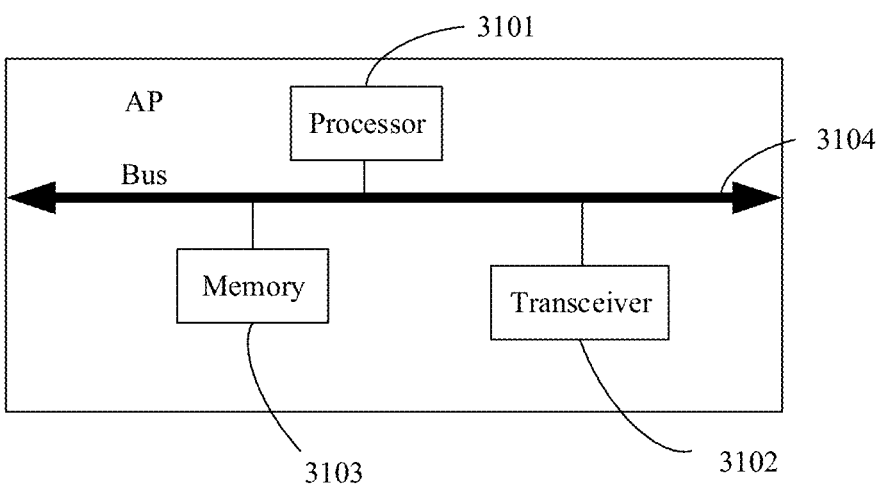
FIG. 31 is a schematic diagram of a structure of an AP according to an embodiment of this application.

FIG. 31 is a schematic diagram of a structure of an AP according to an embodiment of this application. The AP may be applied to the system shown in FIG. 1, to perform a function of the AP in the foregoing method embodiment, or implement an operation or a procedure performed by the AP in the foregoing method embodiment.

As shown in FIG. 31, the AP includes a processor 3101 and a transceiver 3102. In one embodiment, the AP further includes a memory 3103. The processor 3101, the transceiver 3102, and the memory 3103 may communicate with each other through an internal connection path, and transfer a control signal and/or a data signal. The memory 3103 is configured to store a computer program. The processor 3101 is configured to: invoke the computer program from the memory 3103 and run the computer program, to control the transceiver 3102 to receive and send a signal. In one embodiment, the AP may further include an antenna, and the antenna is configured to send, by using a radio signal, uplink data or uplink control signaling output by the transceiver 3102.

The processor 3101 may correspond to the processing module in FIG. 29, and may be combined with the memory 3103 into a processing apparatus. The processor 3101 is configured to execute program code stored in the memory 3103 to implement the foregoing function. During implementation, the memory 3103 may alternatively be integrated into the processor 3101, or may be independent of the processor 3101.

The transceiver 3102 may correspond to the receiving module and the sending module in FIG. 29, and may also be referred to as a transceiver unit or a transceiver module. The transceiver 3102 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the AP shown in FIG. 31 can implement the processes related to the AP in the method embodiments shown in FIG. 6, FIG. 12, FIG. 18, and FIG. 21. The operations and/or the functions of the modules in the AP are separately for implementing corresponding procedures in the foregoing method embodiments. For details, refer to the descriptions in the foregoing method embodiments. To avoid repetition, detailed descriptions are properly omitted herein.

The processor 3101 may be configured to perform an action implemented inside the AP described in the foregoing method embodiment, and the transceiver 3102 may be configured to perform an action of sending performed by the AP to the first device or receiving performed by the AP from the first device described in the foregoing method embodiment. For details, refer to the descriptions in the foregoing method embodiments. Details are not described herein again.

The processor 3101 may be processors of various types mentioned above. The communication bus 3104 may be a peripheral component interconnect PCI bus, an extended industry standard architecture EISA bus, or the like. The bus may be classified into an address bus, a data bus, a control bus, and the like. For ease of illustration, only one bold line is used in FIG. 31 to represent the bus, which, however, does not mean that there is only one bus or only one type of bus. The communication bus 3104 is configured to implement connection and communication between these components. The transceiver 3102 of the device in embodiments of this application is configured to perform signaling or data communication with another device. The memory 3103 may be memories of various types mentioned above. In one embodiment, the memory 3103 may alternatively be at least one storage apparatus far away from the processor 3101. The memory 3103 stores a group of computer program code or configuration information, and the processor 3101 executes the program in the memory 3103. The processor may cooperate with the memory and the transceiver to perform any method and function of the AP in the foregoing embodiment of this application.

Figure 32:
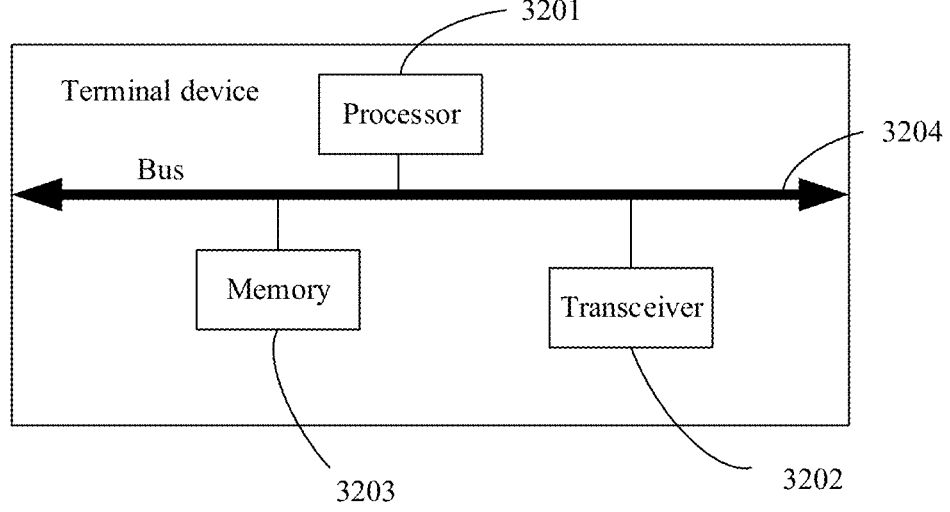
FIG. 32 is a schematic diagram of a structure of a terminal device according to an embodiment of this application.

FIG. 32 is a schematic diagram of a structure of a terminal device according to an embodiment of this application. The terminal device may be applied to the system shown in FIG. 1, to perform a function of the terminal device in the foregoing method embodiment, or implement an operation or a procedure performed by the terminal device in the foregoing method embodiment.

As shown in FIG. 32, the terminal device includes a processor 3201 and a transceiver 3202. In one embodiment, the terminal device further includes a memory 3203. The processor 3201, the transceiver 3202, and the memory 3203 may communicate with each other through an internal connection path, and transfer a control signal and/or a data signal. The memory 3203 is configured to store a computer program. The processor 3201 is configured to: invoke the computer program from the memory 3203 and run the computer program, to control the transceiver 3202 to receive and send a signal. In one embodiment, the terminal device may further include an antenna, and the antenna is configured to send, by using a radio signal, uplink data or uplink control signaling output by the transceiver 3202.

The processor 3201 and the memory 3203 may be combined into one processing apparatus. The processor 3201 is configured to execute program code stored in the memory 3203 to implement the foregoing function. During implementation, the memory 3203 may alternatively be integrated into the processor 3201, or may be independent of the processor 3201.

The transceiver 3202 may correspond to the receiving module and the sending module in FIG. 30, and may also be referred to as a transceiver unit or a transceiver module. The transceiver 3202 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device shown in FIG. 32 can implement the processes related to the terminal device in the method embodiments shown in FIG. 6, FIG.

12, FIG. 18, and FIG. 21. The operations and/or functions of the modules in the terminal device are separately for implementing corresponding procedures in the foregoing method embodiments. For details, refer to the descriptions in the foregoing method embodiments. To avoid repetition, detailed descriptions are properly omitted herein.

The processor 3201 may be configured to perform an action implemented inside the terminal device described in the foregoing method embodiment, and the transceiver 3202 may be configured to perform an action of sending performed by the terminal device to the first device or receiving performed by the terminal device from the first device described in the foregoing method embodiment. For details, refer to the descriptions in the foregoing method embodiments. Details are not described herein again.

The processor 3201 may be processors of various types mentioned above. The communication bus 3204 may be a peripheral component interconnect PCI bus, an extended industry standard architecture EISA bus, or the like. The bus may be classified into an address bus, a data bus, a control bus, and the like. For ease of illustration, only one bold line is used in FIG. 32 to represent the bus, which, however, does not mean that there is only one bus or only one type of bus. The communication bus 3204 is configured to implement connection and communication between these components. The transceiver 3202 of the device in embodiments of this application is configured to perform signaling or data communication with another device. The memory 3203 may be memories of various types mentioned above. In one embodiment, the memory 3203 may alternatively be at least one storage apparatus far away from the processor 3201. The memory 3203 stores a group of computer program code or configuration information, and the processor 3201 executes the program in the memory 3203. The processor may cooperate with the memory and the transceiver to perform any method and function of the terminal device in the foregoing embodiment of this application.

An embodiment of this application further provides a chip system. The chip system includes a processor, configured to support a first device, an AP, or a terminal device to implement a function in any one of the foregoing embodiments, for example, generating or processing a first frame or a trigger frame in the foregoing method. In one embodiment, the chip system may further include a memory. The memory is used for program instructions and data for the first device, the AP, or the terminal device. The chip system may include a chip, or may include the chip and another discrete device. Input and output of the chip system respectively correspond to a receiving operation and a sending operation of the first device, the AP, or the terminal device in the method embodiment.

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (CPU), a network processor (NP), a digital signal processing circuit (DSP), a microcontroller (micro controller unit, MCU), a programmable controller (programmable logic device, PLD), or another integrated chip.

In an implementation process, the operations in the foregoing methods can be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again.

It should be noted that, the processor in embodiments of this application may be an integrated circuit chip, and has a signal processing capability. In an implementation process, the operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. The operations of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

According to the method provided in embodiments of this application, this application further provides a computer program product. The computer program product includes a computer program. When the computer program is run on a computer, the computer is enabled to perform the method according to any one of embodiments shown in FIG. 6, FIG. 12, FIG. 18, and FIG. 21.

According to the method provided in embodiments of this application, this application further provides a computer-readable medium. The computer-readable medium stores a computer program. When the computer program is run on a computer, the computer is enabled to perform the method in any one of embodiments shown in FIG. 6, FIG. 12, FIG. 18, and FIG. 21.

According to the method provided in embodiments of this application, this application further provides a system, including the foregoing one or more first devices, one or more first APs, and one or more terminal devices.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium (temporary storage medium or non-transitory storage medium) or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid state disc (SSD)), or the like.

The first AP and the first device in the foregoing apparatus embodiments correspond to the first AP or the first device in the method embodiments. A corresponding module or unit performs a corresponding operation. For example, a receiving module and a sending module (a transceiver) perform a receiving operation or a sending operation in the method embodiments, and an operation other than the sending operation and the receiving operation may be performed by a processing module (a processor). For a function of a module, refer to the corresponding method embodiment. There may be one or more processors.

A person of ordinary skill in the art may be aware that, in combination with illustrative logical blocks (illustrative logical block) described in embodiments disclosed in this specification and operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional modules in embodiments of this application may be integrated into one processing module, or each of the modules may exist alone physically, or two or more modules are integrated into one module.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel access method, comprising:

allocating, by a first device, a plurality of slots to a plurality of access points (APs) in one slot interval, wherein one AP corresponds to one slot;

determining, by the first device, a first frame that comprises first indication information, wherein the first indication information indicates a first AP from the plurality of APs to perform contention access for a first traffic in a first slot from the plurality of slots, and wherein the first traffic comprises a traffic for which channel access is performed using a priority interframe space (PIFS); and sending, by the first device, the first frame to the first AP.

2. The method according to claim 1, wherein the first indication information comprises a slot interval of the first slot, duration of the first slot, and a start moment of the first slot.

3. The method according to claim 1, wherein the first indication information further comprises one or more of the following: a start moment of a beacon, a beacon interval, a duration of a boundary guard interval, or a second slot, and wherein the second slot is a reserved time window.

4. The method according to claim 3, wherein the method further comprises:

selecting, by the first device, one AP from the plurality of APs as a primary AP;

using, by the first device, a timestamp of the primary AP as a first reference moment; and using, by the first device, a time offset of the first slot of the first AP relative to the first reference moment as the start moment of the first slot.

5. The method according to claim 4, wherein the first indication information further comprises the first reference moment.

6. The method according to claim 1, wherein the method further comprises:

using, by the first device, a local clock of the first device as a second reference moment; and using, by the first device, a time offset of the first slot of the first AP relative to the second reference moment as a start moment of the first slot.

7. The method according to claim 6, wherein the method further comprises:

sending, by the first device, a second frame to the first AP that indicates that the first AP is prohibited from performing contention access using the PIFS.

8. A channel access method, comprising:

receiving, by a first access point (AP) in at least one access point (AP), a first frame from a first device, wherein the first frame comprises first indication information; and performing, by the first AP, contention access for a first traffic in a first slot based on the first indication information, wherein the first traffic comprises a traffic for which channel access is performed using a priority interframe space (PIFS), the first slot is allocated, by the first device, to the first AP, from a plurality of slots allocated to a plurality of access points (APs) in one slot interval, and one AP corresponding to one slot.

9. The method according to claim 8, wherein the first indication information comprises the slot interval of the first slot, duration of the first slot, and a start moment of the first slot.

10. The method according to claim 8, wherein the first indication information further comprises one or more of the following: a start moment of a beacon, a beacon interval, duration of a boundary guard interval, or a second slot, and wherein the second slot is a reserved time window.

11. The method according to claim 10, wherein the start moment of the first slot is a time offset of the first slot of the first AP relative to a first reference moment, the first reference moment is a timestamp of a primary AP, and the primary AP is an AP selected from the at least one AP.

12. The method according to claim 11, wherein the first indication information further comprises the first reference moment.

13. The method according to claim 8, wherein a start moment of the first slot is a time offset of the first slot of the first AP relative to a second reference moment, and wherein the second reference moment is a local clock of the first device.

14. The method according to claim 13, wherein the method further comprises:

receiving, by the first AP, a second frame from the first device that indicates the first AP is prohibited from performing contention access by using the PIFS.

15. A channel access apparatus, comprising:

a non-transitory memory storage comprising instructions; and one or more processors in communication with the memory, wherein the one or more processors execute the instructions to:

allocate, by a first device, a plurality of slots to a plurality of access points (APs) in one slot interval, wherein one AP corresponds to one slot;

determine a first frame that comprises first indication information, wherein the first indication information indicates a first AP from the plurality of APs to perform contention access for a first traffic in a first slot from the plurality of slots, and wherein the first traffic comprises a traffic for which channel access is performed using a priority interframe space (PIFS); and send the first frame to the first AP.

16. The apparatus according to claim 15, wherein the first indication information comprises a slot interval of the first slot, duration of the first slot, and a start moment of the first slot.

17. The apparatus according to claim 15, wherein the first indication information further comprises one or more of the following: a start moment of a beacon, a beacon interval, a duration of a boundary guard interval, and a second slot, and wherein the second slot is a reserved time window.

18. The apparatus according to claim 17, wherein the one or more processors execute the instructions to:

select one AP from the plurality of APs as a primary AP;

use a timestamp of the primary AP as a first reference moment; and use a time offset of the first slot of the first AP relative to the first reference moment as the start moment of the first slot.

19. The apparatus according to claim 18, wherein the first indication information further comprises the first reference moment.

20. The apparatus according to claim 15, wherein the one or more processors execute the instructions to:

use a local clock of the apparatus as a second reference moment; and use a time offset of the first slot of the first AP relative to the second reference moment as a start moment of the first slot.

* * * * *